(12) United States Patent
Pezent et al.

(10) Patent No.: US 11,550,397 B1
(45) Date of Patent: Jan. 10, 2023

(54) SYSTEMS AND METHODS FOR SIMULATING A SENSATION OF EXPENDING EFFORT IN A VIRTUAL ENVIRONMENT

(71) Applicant: META PLATFORMS TECHNOLOGIES, LLC, Menlo Park, CA (US)

(72) Inventors: Matthew Evan Pezent, Redmond, WA (US); Nicholas Colonnese, Kirkland, WA (US); Justin Clark, Kirkland, WA (US); Jessica Hartcher-O'Brien, Redmond, WA (US); Priyanshu Agarwal, Kirkland, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/066,652

(22) Filed: Oct. 9, 2020

Related U.S. Application Data

(60) Provisional application No. 62/913,689, filed on Oct. 10, 2019.

(51) Int. Cl.
*G06F 3/01* (2006.01)
*G01L 5/00* (2006.01)
*G06T 7/20* (2017.01)

(52) U.S. Cl.
CPC ............ *G06F 3/016* (2013.01); *G01L 5/0038* (2013.01); *G06F 3/011* (2013.01); *G06T 7/20* (2013.01)

(58) Field of Classification Search
CPC .......... G06F 3/016; G06F 3/011; G06F 3/014; G06F 3/04186; G01L 5/0038; G06T 7/20; A61B 5/4561; G09B 19/0038; A63F 13/212
USPC .................................................. 345/163, 173
See application file for complete search history.

(56) References Cited

U.S. PATENT DOCUMENTS

| | | | |
|---|---|---|---|
| 2005/0110758 A1* | 5/2005 | Kyung .................... | G06F 3/016 345/163 |
| 2012/0299859 A1* | 11/2012 | Kinoshita ........... | G06F 3/04186 345/173 |
| 2017/0038830 A1* | 2/2017 | Clement ............... | A63F 13/212 |
| 2018/0204426 A1* | 7/2018 | Nagisetty ............... | G06F 3/016 |
| 2018/0284896 A1* | 10/2018 | Kearney ................ | G06F 3/014 |
| 2019/0247707 A1* | 8/2019 | Lagree ............... | G09B 19/0038 |
| 2019/0290202 A1* | 9/2019 | Di Pardo ............. | A61B 5/4561 |
| 2021/0132695 A1* | 5/2021 | Yokoyama .............. | G06F 3/016 |

* cited by examiner

*Primary Examiner* — Abdul-Samad A Adediran
(74) *Attorney, Agent, or Firm* — FisherBroyles, LLP

(57) ABSTRACT

The disclosed method may include detecting motion of a user, estimating, for the detected motion of the user, effort expended by the user in performing the motion, determining, based on the detected motion and the estimation of expended effort, a haptic profile for conveying to the user a physical sensation of expending the effort, and simulating a sensation of expending the effort by executing the haptic profile in at least one haptic device that is worn by the user. Various other methods, systems, and/or computer-readable media are also disclosed.

20 Claims, 23 Drawing Sheets

SYSTEMS AND METHODS FOR SIMULATING A SENSATION OF EXPENDING EFFORT IN A VIRTUAL ENVIRONMENT

CROSS-REFERENCE TO RELATED APPLICATION

This application claims the benefit of U.S. Provisional Patent Application Ser. No. 62/913,689, titled "SYSTEMS AND METHODS FOR SIMULATING A SENSATION OF EXPENDING EFFORT IN A VIRTUAL ENVIRONMENT," filed Oct. 10, 2019, the entire disclosure of which is incorporated herein by this reference.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
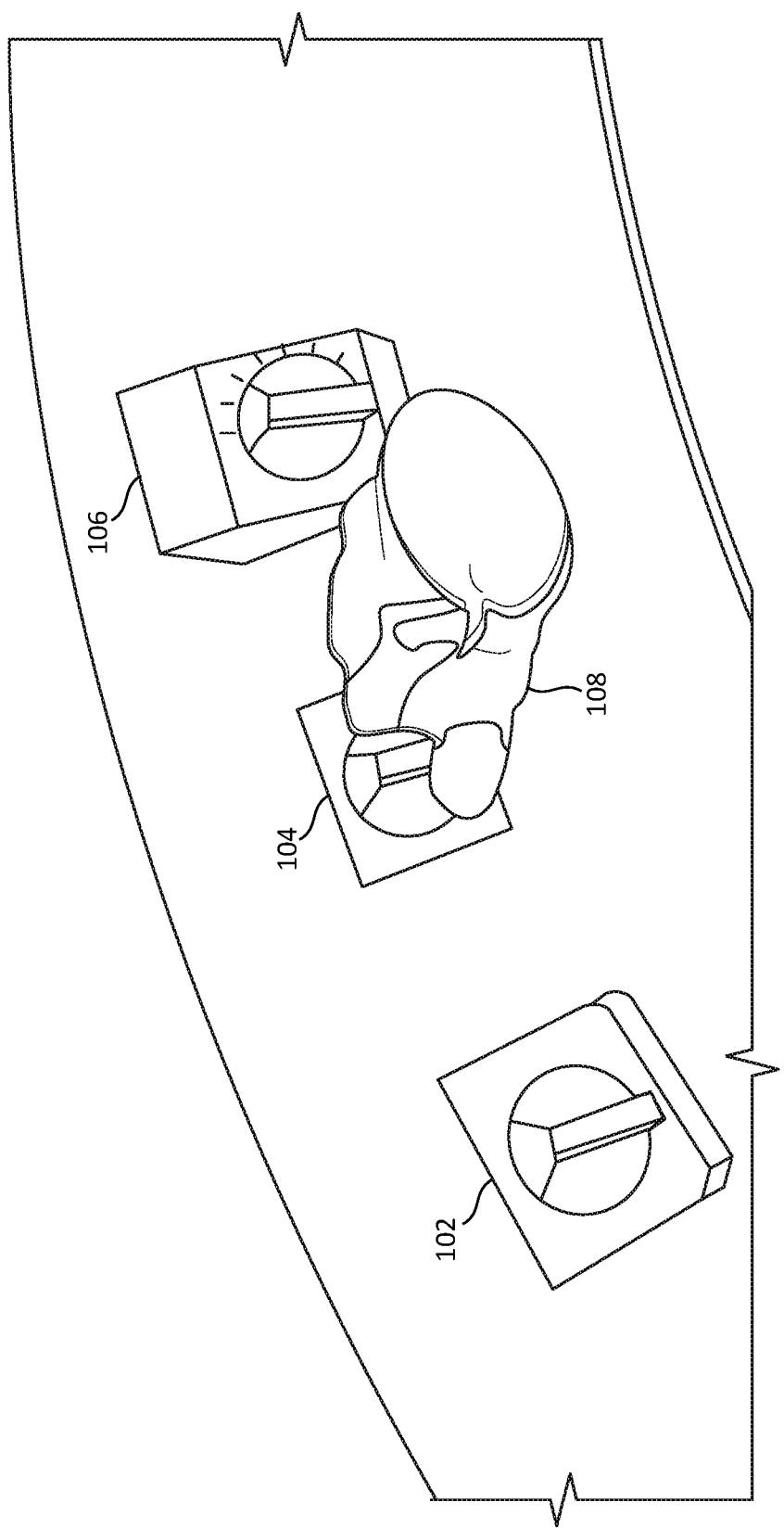
FIG. 1 illustrates a virtual representation of a user contact event, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure describes systems and methods for mapping a haptic stimulus to a perceived effort (e.g., a force sensation). In some examples, the systems and methods may include detecting motion of a user and estimating an effort expended by the user in performing the motion. The methods may further include determining, based on the detected motion and the estimation of the expended effort, a haptic profile for simulating a sensation of expending the effort. The methods may further include simulating a sensation of expending the effort by executing the haptic profile via at least one haptic device that is in contact with the user.

In some examples, the systems and methods may include mapping one or more forces to be provided at a wrist of a user by a haptic device to one or more force sensations. The forces may be applied to the wrist of the user by the haptic device. Applying the forces (e.g., vibrational forces, squeezing forces, etc.) to the wrist of the user by the haptic device may induce a perception of force sensations to another body part of the user. For example, applying the forces to the wrist of the user by the haptic device may induce a perception of force sensations (e.g., implied kinesthetic forces) to a hand of the user, fingers of the user, a palm of the user, or a combination thereof. In some examples, the perceived force sensations may simulate an interaction of a palm and/or fingers of the user with a virtual stationary object or a virtual movable object (e.g., a compressive object such as a ball).

The following will provide, with reference to FIGS. 1-23, detailed descriptions of systems and methods for mapping a haptic stimulus to a perceived effort. First, a description of contact events experienced by a user in a virtual environment is presented in reference to FIGS. 1-3C. A description of control-display ratio of contact events is presented in reference to FIG. 4. A description of a multisensory haptic device in a virtual gaming environment is presented in reference to FIG. 5. A description of a wrist-mounted wearable device is presented in reference to FIG. 6. A description of a block diagram of an example head-mounted display (HMD) system is presented in reference to FIG. 7. A description of a graphical user interface for an application programming interface is presented in reference to FIG. 8. A description of example components of the wrist-mounted wearable device is presented in reference to FIGS. 9-12. A description of examples of a user's hand and/or fingers interacting with virtual objects is presented in reference to FIGS. 13-15. A description of a flowchart of a method for mapping a haptic stimulus profile to a perceived effort is presented in reference to FIG. 16. A description of various types of example artificial-reality devices that may be used with a wrist-mounted wearable device is presented in reference to FIGS. 17-23.

The embodiments herein may find certain advantages in an artificial-reality environment, such as simulating a sensation of expending user effort by executing a haptic profile. However, the embodiments herein may also be used in a variety of other environments, including but not limited to gaming, industrial simulators, robotics, and any suitable environment where simulating a sensation of expending user effort by executing a haptic profile is desired.

FIG. 1 is an illustration of a virtual representation of a user contact event. A user may view a virtual representation of detected motion within a virtual environment. For example, a user may view motion of body part 108 (e.g., a hand) in a virtual environment. The motion of body part 108, as viewed in the virtual environment, may correspond to a detected movement of a real body part in real-time. The motion of the body part may be tracked and viewed in a virtual environment as described below with reference to FIG. 7. In some examples, a user may interact with virtual objects such as virtual objects 102, 104, and 106. Virtual objects 102, 104, and 106 may be virtual representations of rotary switches (as shown in FIG. 1), buttons, triggers, stationary objects, handles, knobs, levers, flip switches, or any other virtual object with which a user may interact. Body part 108 may interact with virtual objects 102, 104, and 106 through a contact event. For example, body part 108 may rotate a knob on virtual object 104 to simulate selecting a position on a rotary switch.

A user viewing the motion of body part 108 rotating a knob on virtual object 104 in a virtual environment may desire to experience a perceived physical sensation that simulates the effort expended in rotating the knob on virtual object 104. Further, each of virtual objects 102, 104, and 106 may have different characteristics, such as a different force required to rotate the knob where a varying force increases as the degree of rotation increases. The user viewing the motion of body part 108 may desire to experience a perceived physical sensation (e.g., a perceived force sensation) that matches the varying forces corresponding to the contact event of rotating the knob on virtual object 104.

FIGS. 2A-2D illustrate additional example contact events that may be experienced by a user in a virtual environment.

As described with reference to FIG. 1, a user may desire to experience a perceived physical sensation (e.g., a perceived force sensation) that corresponds to the contact event. Referring to FIG. 2A, a user may press button 202 in a virtual environment. Button 202 may have a force associated with the pressing of the button 202 such as a spring force directed opposite to the direction the user is pressing the button 202. This opposing force may be experienced as a perceived physical sensation by the user through a haptic profile executed by haptic device 204 worn by the user. Haptic device 204 may be worn on any part of the user's body, such as a wrist, as the user performs the motion of pressing button 202.

The motion of the user may be detected and viewed by the user in a virtual environment, such as is described below with reference to FIG. 7. As the user performs the motion of pressing button 202 in a virtual environment, haptic device 204 may execute a haptic profile that allows the user to experience a perceived physical sensation (e.g., a perceived force sensation) of pressing the button 202. Although haptic device 204 may be worn on a wrist of the user, haptic device 204 may be a multi-sensory haptic device that delivers haptic stimulus to multiple cutaneous sensory channels such that the physical sensation may be experienced (e.g., perceived) by the user on another body part (e.g., the user's finger pressing virtual button 202). In additional embodiments, the haptic stimulus delivered to the user's body part (e.g., wrist) may be perceived at the body part, and the user may learn to associate the sensation at the body part with a virtual action on the other body part (e.g., the finger(s)).

Figure 2B:
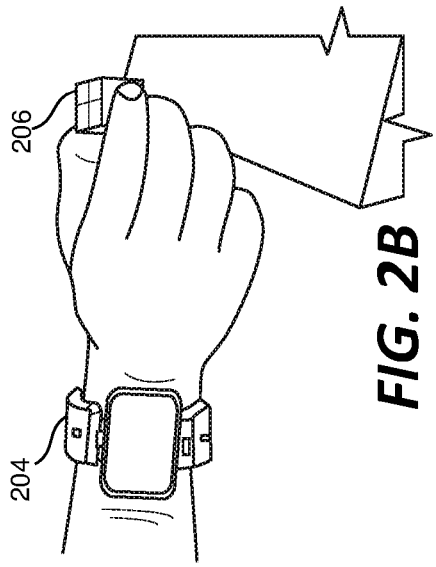
FIGS. 2A-2D illustrate contact events experienced by a user in a virtual environment, according to additional embodiments of the present disclosure.

Referring to FIG. 2B, a user may place object 206 on a stationary surface (e.g., a shelf, table, etc.) in a virtual environment. Object 206 may have a perceived mass experienced by the user (e.g., a perceived gravity force sensation) and placing object 206 on the shelf may create a perception of releasing an object with mass from the user's hand. This releasing of object 206 may be experienced as a perceived physical sensation by the user through a haptic profile executed by haptic device 204 worn by the user.

Figure 2D:
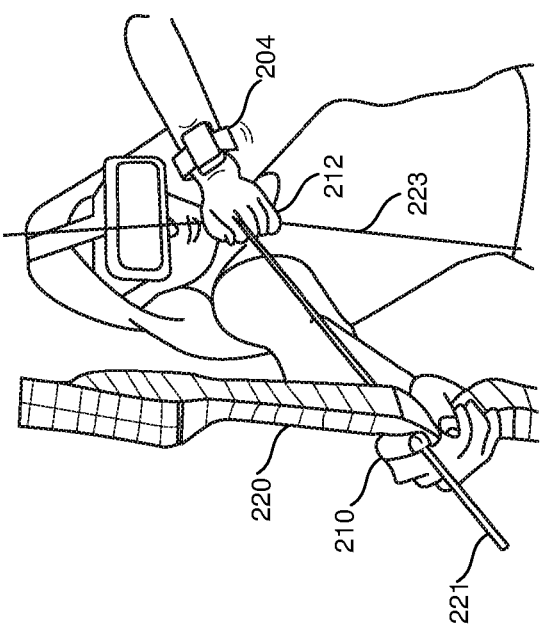
Figure 2A:
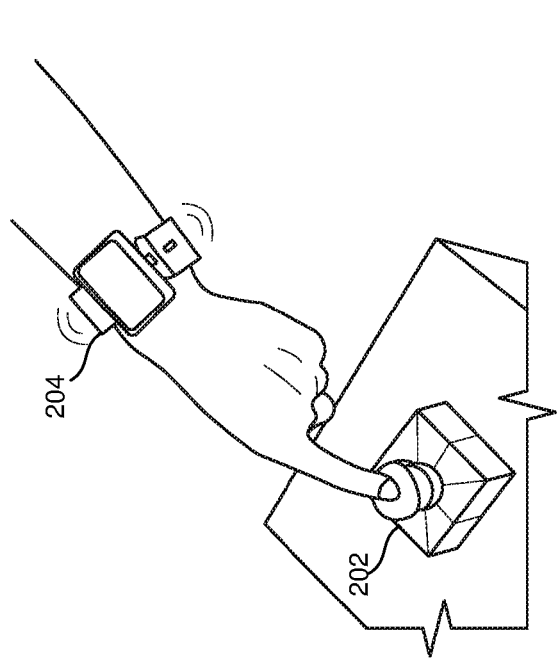
Figure 2C:
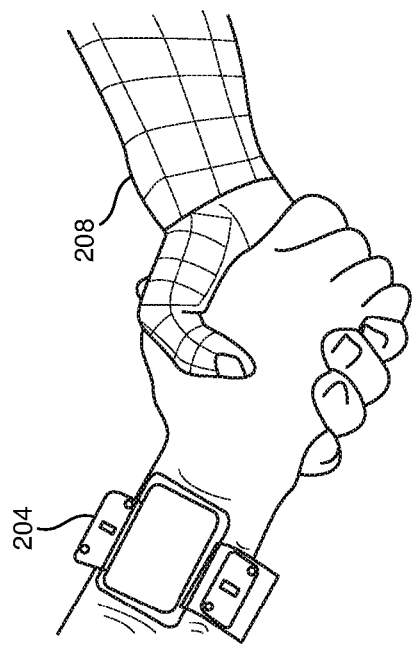

Referring to FIG. 2C, the user may shake a person's hand in a virtual environment. Virtual hand 208 may have a grip profile (e.g., a force profile, such as including a compression) associated with the hand shaking. The grip profile of hand 208 may be experienced as a perceived physical sensation by the user through a haptic profile executed by haptic device 204 worn by the user.

Referring to FIG. 2D, the user may play a virtual game (e.g., archery). For example, when playing an archery game, the user may perform the motions of gripping a bow 220 and drawing back an arrow 221. The detected motions may be viewed by the user (e.g., viewed on an HMD (e.g., HMD 2002 of FIG. 20) and as the user draws back bow 220, haptic devices 204 worn on one or both wrists of the user may execute a haptic profile providing a perceived physical sensation that simulates the effort of drawing back bow 220. Haptic device 204 worn on the wrist of the arm holding bow 220 may execute a haptic profile that is felt within various parts of the user's body such as the arm, wrist, and/or hand 210 holding the bow. Haptic device 204 worn of the wrist of the arm pulling bow string 223 may execute a haptic profile that is perceived within the arm, wrist, hand 212, and/or fingers pulling bow string 223.

Figure 3C:
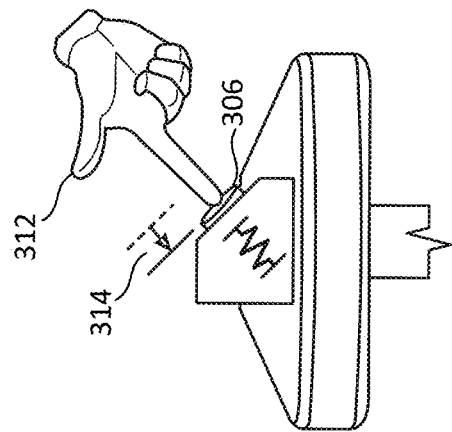
FIGS. 3A-3C illustrate a control-display ratio of contact events experienced by a user in a virtual environment, according to at least one embodiment of the present disclosure.
Figure 3B:
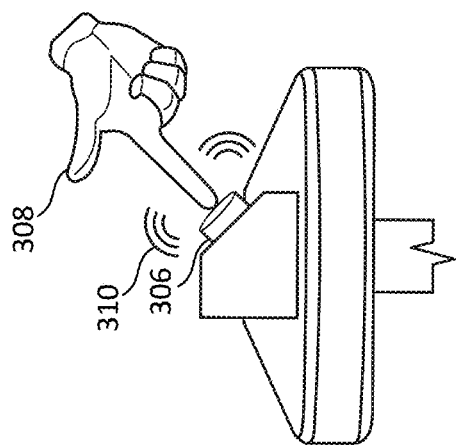
Figure 3A:
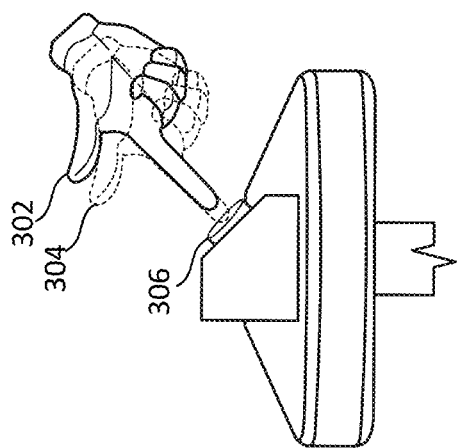

FIGS. 3A-3C illustrate a control-display ratio of contact events experienced by a user in a virtual environment. As described with reference to FIG. 1, a user may desire to experience a perceived physical sensation that corresponds to a contact event. For example, as shown in FIG. 3A, a user may press button 306 in a virtual environment. Button 306 may have a force associated with the pressing of the button 306 such as a spring force directed opposite to the direction the user is pressing the button. As described with reference to FIG. 2, this opposing force may be experienced as a perceived physical sensation by the user through a haptic profile executed by haptic device 204 worn by the user.

Additionally or alternatively, a user's perception of physical sensation in a virtual environment may be improved by changing the control-display ratio of a detected range of motion. For example, when pressing button 306, a user may perform a motion indicated by a detected actual hand motion 304. Actual hand motion 304 (shown in FIG. 3A in short dashed lines) may represent the actual motion detected of the user's hand. A displayed hand motion 305 (shown in FIG. 3A in long dashed lines) may represent the hand motion displayed to the user in the virtual environment and may be a modified (e.g., amplified, diminished, or exaggerated) representation of the actual hand motion of the user. In some examples, the modified representation of the detected motion of the user may include an adjusted (e.g., larger or smaller) range of the detected motion of the user. The user may experience the simulated sensation of pressing button 306 further based on displaying the modified representation of the detected motion (e.g., pressing button 302) to the user. This modified representation of the detected motion may increase or decrease the effort perceived by the user of the detected motion.

In another example as shown in FIG. 3B, the user may perform a hand motion 308 of contacting a button. Upon initial contact, a haptic device may execute a haptic profile that includes applying vibrotactile stimulus 310 to the user (e.g., applying vibrotactile stimulus via vibrotactor(s) 906 of FIG. 9). As the user performs hand motion 312 of pressing the button through displacement 314, the haptic device may execute a multisensory haptic profile by applying a vibrotactile stimulus (e.g., applying vibrotactile stimulus via vibrotactor(s) 906 of FIG. 9) and a squeezing stimulus (e.g., applying a squeezing stimulus via wearable device 600 of FIG. 6) to the user. As shown in FIG. 3C, as the user presses the button 306 through displacement 314, the haptic profile may include increasing the intensity (e.g., magnitude, frequency) of the vibrotactile and/or the squeezing stimulus in order to increase the perceived intensity of the stimulus on the user. The increased perceived intensity of the stimulus may simulate virtual button 306 with an increasing spring force as the button is pressed through displacement 314.

Figure 4:
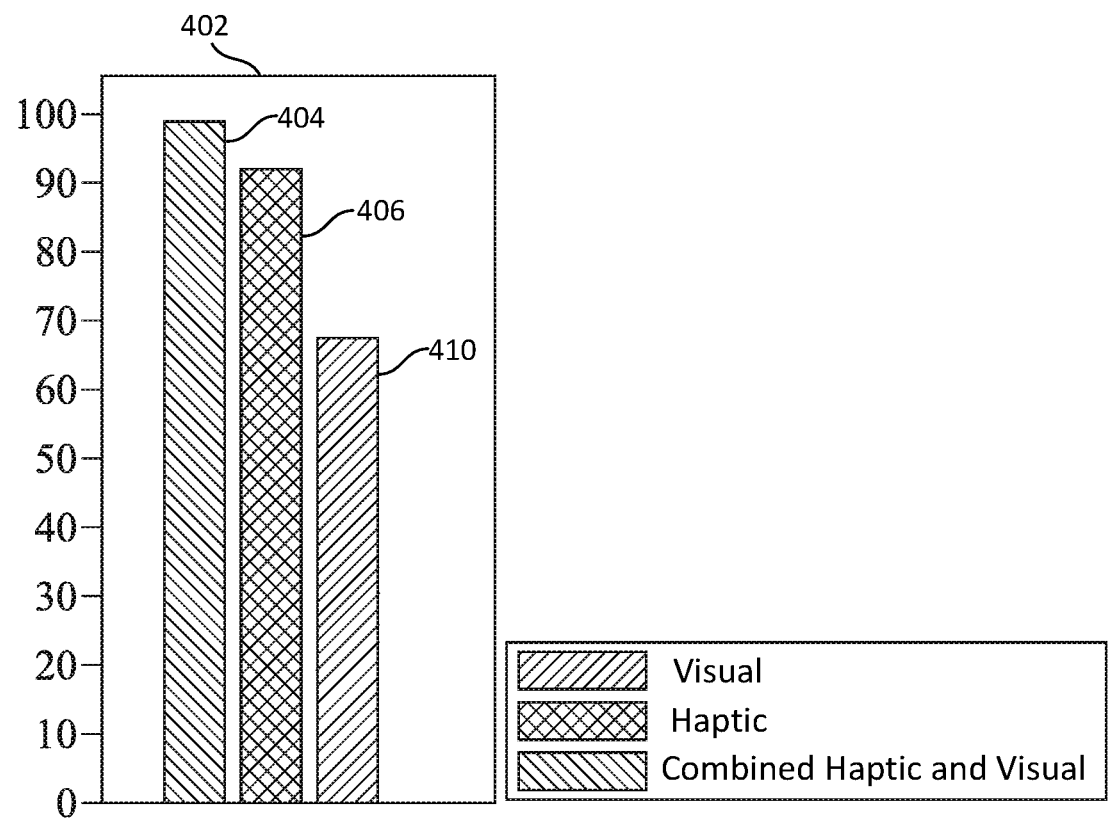
FIG. 4 is a graph illustrating users' perception of identifying virtual contact events, according to at least one embodiment of the present disclosure.

FIG. 4 is a graph 402 illustrating the perception of identifying virtual contact events as described by multiple users. As described with reference to FIGS. 3A-3C, a user may have an increase in perceived effort of a contact event (e.g., pressing a button) through executing a haptic profile and/or changing the control-display ratio of the detected range of motion associated with the contact event. Graph 402 shows the results of an experiment in which multiple users were required to select the "stiffer" of two buttons in each trial.

Stiffness may be parameterized by the combination of $K_h$, representing a squeeze force generated by a haptic device worn on the wrist (e.g., wearable device 600 of FIG. 6) and $K_v$, representing the perceived stiffness created through the visual control-display ratio. A higher $K_h$ value increased the rate and/or the magnitude of the wrist squeeze as the button was pressed. A higher $K_v$ value increased the distance users had to reach (e.g., increased displacement 314) with their physical hand to achieve a particular button displacement. One of the two buttons (the "standard button") included standard $K_h$ and $K_v$ values, while the other button was in one of three conditions: haptics only (e.g., squeeze only), visual control-display only, or combined haptics and visual control-display. The bar graph of FIG. 4 shows the results, suggesting that combined haptics and visual control-display, shown in bar 404, achieved the highest level of accuracy in simulating perceived effort, while haptics only, shown in bar 406, achieved a lower level of accuracy for simulating perceived effort than combined haptics and visual control-display. Visual control-display only, shown in bar 410, achieved the lowest level of accuracy for simulating perceived effort.

Figure 5:
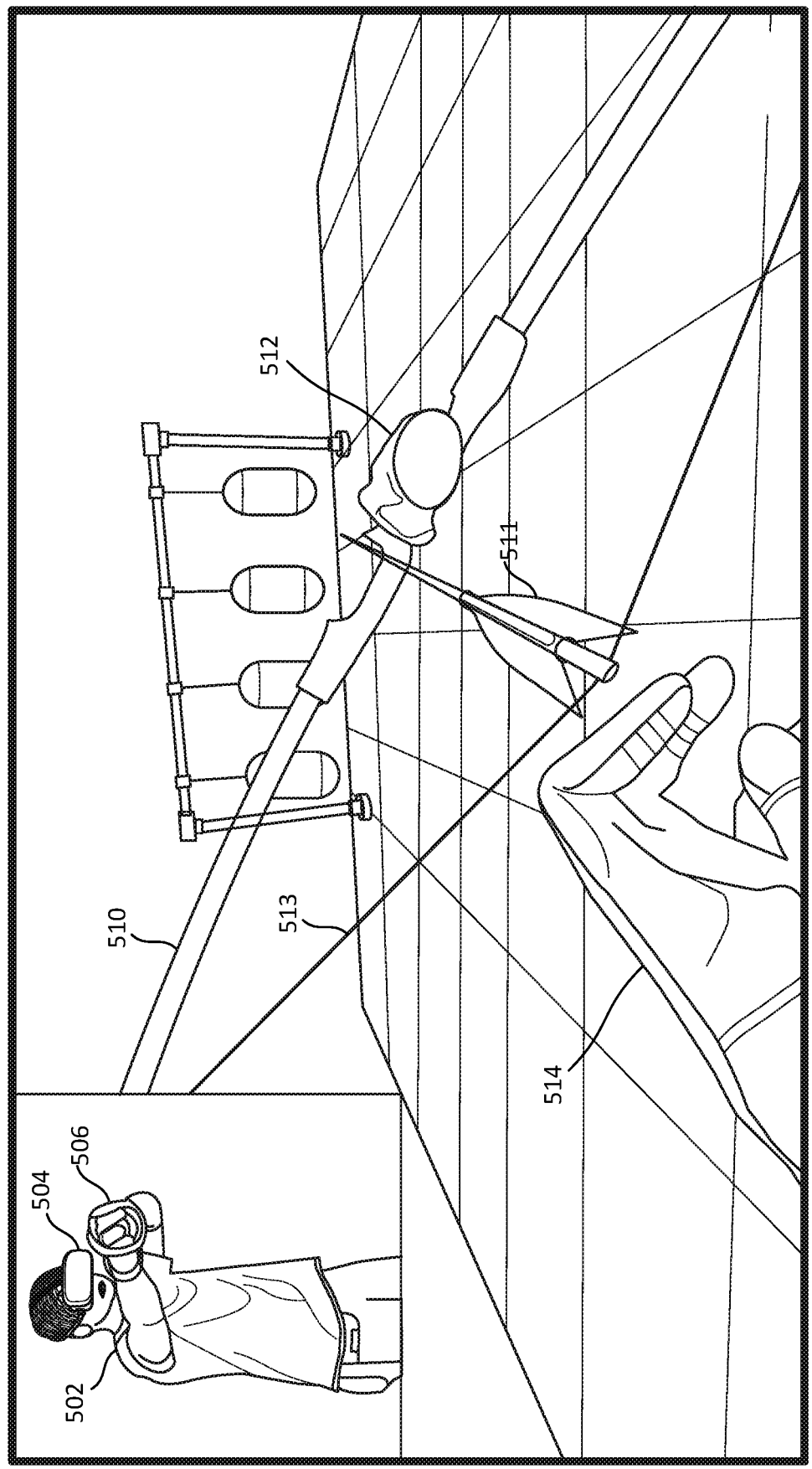
FIG. 5 is an example embodiment of a virtual gaming environment, according to at least one embodiment of the present disclosure.

FIG. 5 illustrates an example embodiment of a virtual gaming environment. As described with reference to FIG. 2D, a user may perform the motions of gripping a bow 510 and drawing back an arrow 511 when playing a virtual archery game. The motion of user 502 may be detected by a sensor of an artificial-reality system, such as in an HMD device 504, in a handheld controller 506 (e.g., handheld controller 770 described with reference to FIG. 7), etc. The motion of user 502 may be viewed by user 502 on HMD device 504 (e.g., HMD device 705 described with reference to FIG. 7). As user 502 extends a right hand, user 502 may view virtual right hand 512 gripping bow 510. As user 502 draws back a left hand, user 502 may view virtual left hand 514 drawing back bow string 513.

While performing the motions detected by handheld controller 506, a processor (e.g., processing subsystem 710 described with reference to FIG. 7) may estimate an effort expended by the user in performing the motion. The processor may determine, based on the detected motion and the estimation of expended effort, an appropriate haptic profile for conveying the perceived physical sensation of gripping bow 510 with right hand 512 of user 502 and drawing back bow string 513 with left hand 514 of user 502. The haptic profile may be executed via one or more haptic devices 508 on body parts (e.g., wrists) of user 502 thereby creating a perception and sensation for user 502 associated with holding bow 510 and drawing arrow 511. Although the haptic profile may be executed on the wrists of user 502 (e.g., via wearable device 600 of FIG. 6), user 502 may perceive the sensations of the expended efforts in other body parts such as in the arms, hands, palms, and/or fingers of user 502.

Figure 6:
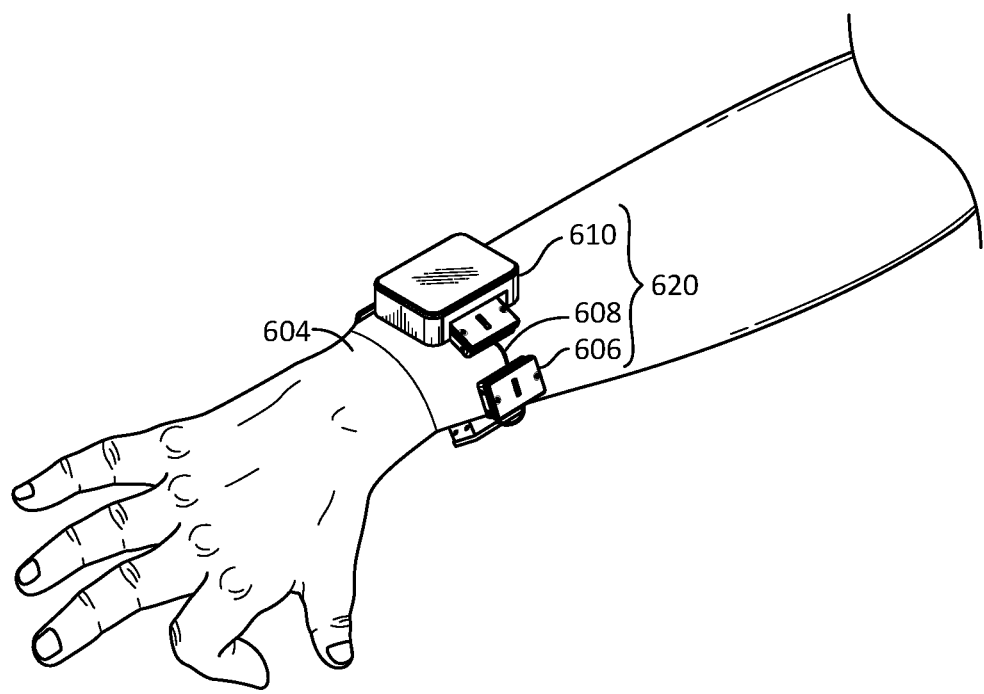
FIG. 6 is a perspective view of an example embodiment of a wearable device, according to at least one embodiment of the present disclosure.

FIG. 6 is a perspective view of an example embodiment of a wearable device 620 (e.g., a haptic device). In this embodiment, wearable device 620 may be dimensioned to fit about user's wrist 604. Wearable device 620 may include a plurality of band elements 606 and a tensioning mechanism 608 that connects band elements 606 to one another, as shown and described in greater detail below with reference to FIGS. 9-12. Band elements 606 may be configured in a variety of ways including, for example, a single band that harnesses tensioning mechanism 608 at a plurality of points on the band (e.g., at the band elements 606). Some examples of band elements 606 are shown and described in greater detail below.

Methods and devices of the present disclosure may include executing a haptic profile in a haptic device that is worn by the user. The haptic profile may include haptic feedback provided to the user by a haptic device (e.g., wearable device 620, haptic devices 1910 and 1920 of FIG. 19, haptic device 2004 of FIG. 20, haptic device 2130 of FIG. 21, etc.). The haptic feedback may include various types of cutaneous feedback, including, without limitation, vibration, force, squeeze, traction, texture, heating, cooling, or a combination thereof. The haptic profile may include varying the frequency and/or magnitude of haptic feedback over time. The frequency of the haptic feedback (e.g., the frequency of vibration of a vibrotactile actuator, the frequency of squeeze feedback from a wrist-worn device, etc.) may be varied over time. For example, the frequency of haptic feedback may be ramped up, ramped down, held constant for a period of time, pulsed within a duty cycle, or a combination thereof. The frequency of haptic feedback may be represented as a periodic function. For example, the frequency of haptic feedback may be represented as a sinusoid, a square wave, a sawtooth wave, a triangle wave, or a combination thereof. Additionally or alternatively, the haptic profile may also include varying the magnitude (e.g., the intensity) of haptic feedback over time. The magnitude of the haptic feedback (e.g., the vibration amplitude of a vibrotactile actuator, the amplitude of a squeeze force of a wrist-worn device, etc.) may be varied over time. The magnitude of haptic feedback may be ramped up, ramped down, held constant for a period of time, pulsed within a duty cycle, or a combination thereof. The magnitude of haptic feedback may also be represented as a periodic function. For example, the magnitude of haptic feedback may be represented as a sinusoid, a square wave, a sawtooth wave, a triangle wave, or a combination thereof. In some examples, other aspects of the haptic feedback may also be controlled and/or adjusted depending on the haptic profile.

One or more of band elements 606 may include any type or form of actuator suitable for executing a haptic profile (e.g., providing haptic feedback). For example, band elements 606 may be configured to provide various types of cutaneous feedback, including, without limitation, vibration, force, traction, texture, heating and/or cooling, or a combination thereof. To provide such feedback to a user, band elements 606 may include one or more of various types of actuators, including motors, piezoelectric actuators, fluidic systems, etc. In one example, each of band elements 606 may include a vibrotactor (e.g., a vibrotactile actuator) configured to vibrate in unison and/or independently to provide one or more of various types of haptic sensations when executing a haptic profile on a user. Alternatively, only a single band element 606 or a subset of band elements 606 may include vibrotactors.

In addition to, or instead of, haptic actuators, one or more of band elements 606 may also include one or more sensors. For example, one or more of band elements 606 may include a force sensor, an optical sensor, an inertial measurement unit (IMU), an acoustic sensor, and/or any other type or form of sensor. Such sensors may be used for calibration (e.g., determining whether to tighten or loosen band elements 606), motion detection, biometric detection, closed-loop control of executing the haptic profile, etc. In some examples, band elements 606 may include neuromuscular sensors (e.g., electromyography (EMG) sensors). The neuromuscular sensors may produce neuromuscular signals that may be used to determine a musculoskeletal position and/or motion of the user. The musculoskeletal position/motion of the user may be used to estimate an effort expended by the user in performing a motion. The present methods may include determining, based on the musculoskeletal position/motion and the estimation of the expended effort, a haptic profile for simulating a sensation of expending the effort. The method may further include simulating a sensation of expending the effort by executing the haptic profile via at least one haptic device that is in contact with the user.

Wearable device 620 may include housing 610 that houses an actuator (e.g., a motor). In this embodiment, tensioning mechanism 608 may be configured as a cable that is strung through each of band elements 606. For example, tensioning mechanism 608 may enter through a side of one band element 606, be strung over a guide mechanism substantially in the center of band element 606 and exit through an opposite side of band element 606. For example, tensioning mechanism 608 may be disposed through a center of each of band elements 606 thereby connecting band elements 606 to one another. At least one end of tensioning mechanism 608 may enter housing 610 and may be mechanically coupled to the actuator residing therein. The other end of tensioning mechanism 608 may be fastened to housing 610 or be mechanically coupled to the actuator through a spool, pulley, and/or a gearbox mechanism.

In some examples, the term "substantially" in reference to a given parameter, property, or condition, may refer to a degree that one skilled in the art would understand that the given parameter, property, or condition is met with a small degree of variance, such as within acceptable manufacturing tolerances. For example, a parameter that is substantially met may be at least about 90% met, at least about 95% met, at least about 99% met, or fully met.

When actuated, the actuator may pull tensioning mechanism 608 into housing 610 to contract a length of tensioning mechanism 608 and provide substantially tangential movement of tensioning mechanism 608 relative to the surface of user's wrist 604. This substantially tangential movement may cause band elements 606 to move in a substantially orthogonal (e.g., radially inward and/or outward) manner relative to the surface of user's wrist 604, thereby producing a substantially even distribution of compression about user's wrist 604. Additionally or alternatively, as tensioning mechanism 608 is configured at or near the center of each of band elements 606, the substantially orthogonal movement of each of band elements 606 may be substantially uniform. For example, as tensioning mechanism 608 contracts, one band element 606 may compress against user's wrist 604 with similar force to any other band element 606 of wearable device 620. As the tangential movement of tensioning mechanism 608 is through the center of each band element 606, wearable device 620 may provide substantially orthogonal motion of each band element 606 relatively devoid of any shearing forces on user's wrist 604. This orthogonal movement may be used to execute the haptic profile and/or to ensure proper fit of wearable device 620.

The squeezing or tightening provided by tensioning mechanism 608 may ensure a proper fit to user's wrist 604 in a variety of ways. For example, tensioning mechanism 608 may cause wearable device 620 to decrease in diameter to better fit user's wrist 604 or other body part. In some embodiments, a baseline tension of the tensioning mechanism 608 may be configured for automatic adjustment by wearable device 620 and/or for manual adjustment by the user. As another example, tensioning mechanism 608 may cause one or more vibrotactors in each band element 606 to have adequate contact with a user's skin for providing haptic feedback to the user. Furthermore, by applying substantially uniform force to each band element 606, tensioning mechanism 608 may ensure that a user perceives haptic feedback from different vibrotactors in different band elements 606 as being substantially equal. As described below with reference to FIGS. 9-10, housing 610 may include a force-transfer plate and a force sensor to control the amount of force applied to user's wrist 604. In this manner, embodiments of the present disclosure may facilitate adequate grounding between a vibrotactor in each band element 606 and a user's skin.

Certain embodiments may be configured with a single band element 606 instead of multiple band elements 606.

Other embodiments may also be asymmetric in some regards. For example, some wearable devices 620 may have a tensioning mechanism that does not run along a center of band elements 606. In such embodiments, tensioning mechanism 608 may be slightly off-center relative to band elements 606, may be positioned at either side of band elements 606, may include multiple tensioning cables, etc. Thus, the guide mechanisms within band elements 606 may also be off-centered.

Figure 7:
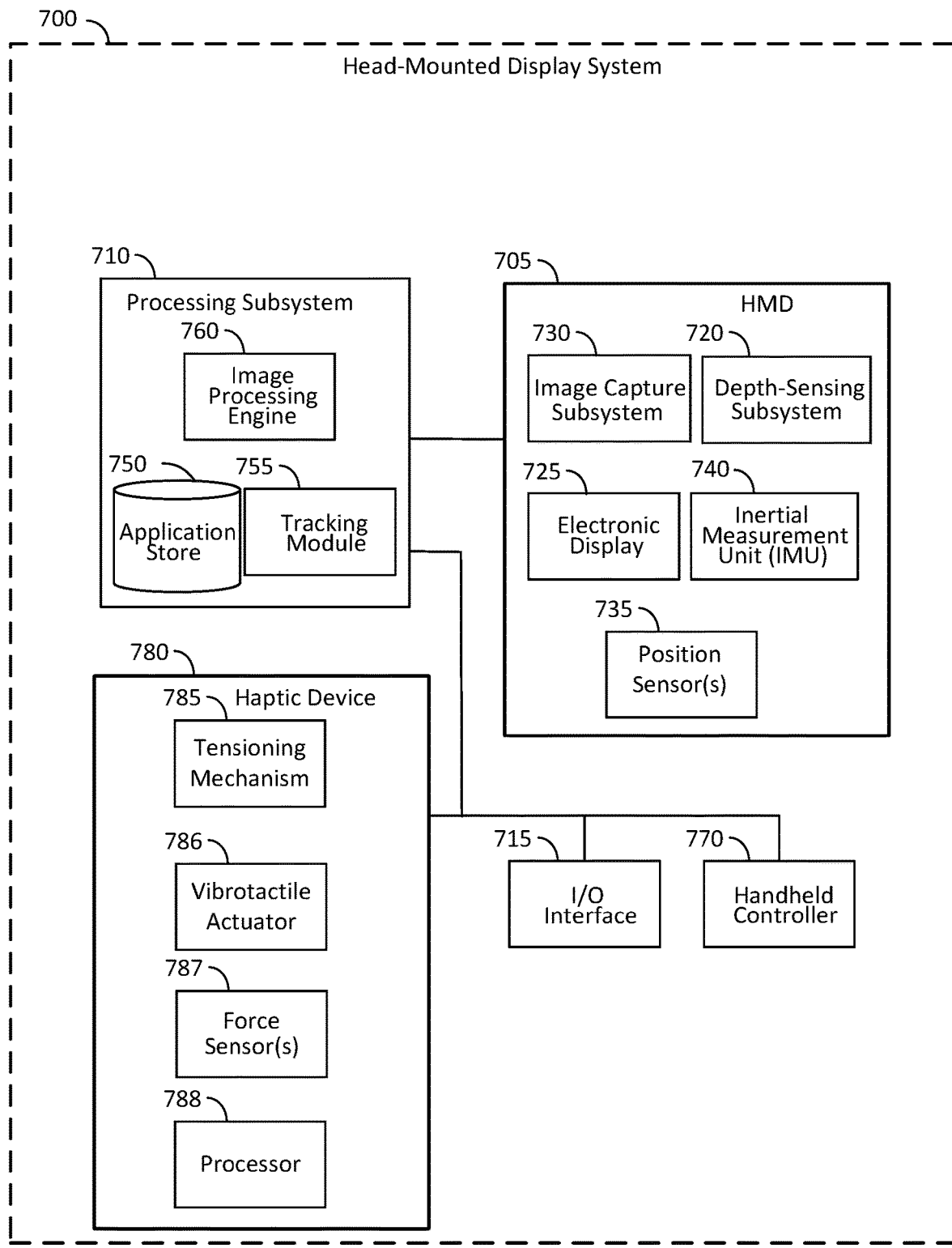
FIG. 7 is a block diagram of an example head-mounted display system, according to at least one embodiment of the present disclosure.

FIG. 7 is a block diagram of an example HMD system 700 (e.g., a type of mobile artificial-reality system) that may present virtual scenes (e.g., captured scenes, artificially generated scenes, or a combination thereof) to a user. HMD system 700 may operate in a virtual-reality system environment, an artificial-reality system environment, or a combination thereof. HMD system 700 may include HMD device 705 that includes and/or communicates with processing subsystem 710, haptic device 780, handheld controller 770, and input/output (I/O) interface 715. In some examples, when worn by a user, HMD device 705 may completely obstruct the user's view of the real-world environment. In some examples, HMD device 705 may only partially obstruct the user's view of the real-world environment and/or may obstruct the user's view depending on content being displayed in a display of HMD device 705.

While FIG. 7 shows an example HMD system 700 that includes at least one HMD device 705, at least one haptic device 780, and at least one I/O interface 715, in other embodiments any number of these components may be included in HMD system 700. For example, HMD system 700 may include multiple HMD devices 705, each having an associated I/O interface 715, with each HMD device 705 and I/O interface 715 communicating with processing subsystem 710 and haptic device(s) 780. In embodiments in which processing subsystem 710 is not included within, or otherwise integrated with, HMD device 705, HMD device 705 may communicate with processing subsystem 710 over a wired connection and/or a wireless connection. In further embodiments, handheld controller 770 may be omitted or multiple handheld controllers 770 may be included. In alternative configurations, different and/or additional components may be included in HMD system 700. In some examples, functionality described in connection with one or more of the components shown in FIG. 7 may be distributed among the components in a different manner than that described with reference to FIG. 7.

HMD device 705 may present a variety of content to a user, including virtual views of an artificially rendered virtual-world environment and/or augmented views of a physical, real-world environment. Augmented views may be augmented with computer-generated elements (e.g., two-dimensional (2D) or three-dimensional (3D) images, 2D or 3D video, sound, etc.). In some examples, the presented content may include audio that is provided via an internal or external device (e.g., speakers and/or headphones) that receives audio information from HMD device 705, processing subsystem 710, or both, and presents audio data based on the audio information.

In some examples, HMD device 705 may include a depth-sensing subsystem 720 (e.g., a depth camera subsystem), an electronic display 725, an image capture subsystem 730 that includes one or more cameras, one or more position sensors 735, and/or an inertial measurement unit (IMU) 740. One or more of these components may provide a positioning subsystem of HMD device 705 that can determine the position of HMD device 705 relative to a real-world environment and individual features contained therein. Other embodiments of HMD device 705 may include an optional eye-tracking or gaze-estimation system configured to track the eyes of a user of HMD device 705 to estimate the user's gaze.

Depth-sensing subsystem 720 may capture data describing depth information characterizing a local real-world area or environment surrounding some or all of HMD device 705. Depth-sensing subsystem 720, in some examples, may compute a depth map using collected data (e.g., based on captured light according to one or more computer-vision schemes or algorithms, by processing a portion of a structured light pattern, by time-of-flight (ToF) imaging, simultaneous localization and mapping (SLAM), etc.), or depth-sensing subsystem 720 can transmit this data to another device, such as an external implementation of processing subsystem 710, that may generate a depth map using the data from depth-sensing subsystem 720. As described herein, the depth maps may be used to generate a model of the real-world environment surrounding HMD device 705. Accordingly, depth-sensing subsystem 720 may be referred to as a localization and modeling subsystem or may be a part of such a subsystem. Depth-sensing subsystem 720 may detect motion of a user. For example, depth-sensing subsystem 720 may detect motion of the hands of a user. The effort expended by the user in performing the motion may be based on the detected motion of the user.

Electronic display 725 may display 2D or 3D images to the user in accordance with data received from processing subsystem 710. In some examples, electronic display 725 may include a single electronic display or multiple electronic displays (e.g., a display for each eye of the user). Examples of electronic display 725 may include, but are not limited to, a liquid crystal display (LCD), an organic light-emitting diode (OLED) display, an inorganic light-emitting diode (ILED) display, an active-matrix organic light-emitting diode (AMOLED) display, a transparent organic light-emitting diode (TOLED) display, another suitable display, or some combination thereof. In some examples, electronic display 725 may be opaque such that the user cannot see the local environment through electronic display 725.

Image capture subsystem 730 may include one or more optical image sensors or cameras that capture and collect image data from the local environment. In some examples, the sensors included in image capture subsystem 730 may provide stereoscopic views of the local environment that may be used by processing subsystem 710 to generate image data that detects the motion of user body parts, characterizes the local environment and/or a position and orientation of HMD device 705 within the local environment. For example, image capture subsystem 730 may detect motion of the hands of a user. The effort expended by the user in performing the motion may be based on the detected motion of the hands of the user.

In some examples, the image data may be processed by processing subsystem 710 or another component of image capture subsystem 730 to generate a three-dimensional view of the local environment. For example, image capture subsystem 730 may include SLAM cameras or other cameras that include a wide-angle lens system that captures a wider field-of-view than may be captured by the eyes of the user.

IMU 740, in some examples, may represent an electronic subsystem that generates data indicating a position and/or orientation of HMD device 705 based on measurement signals received from one or more of position sensors 735 and/or from depth information received from depth-sensing subsystem 720 and/or image capture subsystem 730. For example, position sensors 735 may generate one or more measurement signals in response to the motion of HMD device 705. Examples of position sensors 735 include one or more accelerometers, one or more gyroscopes, one or more magnetometers, another suitable type of sensor that detects motion, a type of sensor used for error correction of IMU 740, or some combination thereof. Position sensors 735 may be located external to IMU 740, internal to IMU 740, or some combination thereof.

I/O interface 715 may represent a subsystem or device that allows a user to send action requests and receive responses from processing subsystem 710 and/or a hand-secured or handheld controller 770. In some examples, I/O interface 715 may facilitate communication with more than one handheld controller 770. For example, the user may have two handheld controllers 770, with one in each hand.

In some examples, handheld controller 770 may include separate IMU 740 that captures inertial data indicating an estimated position of handheld controller 770 relative to an initial position. Handheld controller 770 may calculate the motion of a body part of a user. For example, handheld controller 770 may calculate a linear velocity of the body part of the user, a linear acceleration of the body part of the user, a rotational velocity of the body part of the user, or a rotational acceleration of the body part of the user. For example, IMU 740 may detect motion of the hands of a user and may produce data used for calculating the velocity and/or acceleration of the body part. The effort expended by the user in performing the motion may be based on the detected motion of the hands of the user.

HMD 700 may include haptic device 780. Haptic device 780 may provide a wearer of haptic device 780 with a physical sensation. The physical sensation may be, for example, a haptic profile that simulates a sensation of expending an effort. HMD 700 and/or IMU 740 may detect a motion of a user and estimate an effort expended by the user in making the motion. As described below, tracking module 755 may track the motion of the user, including a body part(s) (e.g., hand, finger, palm, etc.) of the user. The motion of the user may be synchronized with visual content displayed to the user. The user may be performing a motion while electronic display 725 may be displaying a virtual image representing the user and/or a body part thereof while performing the motion. In some embodiments, the virtual image may accurately display the motion of the user in real-time.

Processing subsystem 710 may estimate an amount of effort expended by the user when performing the motion based on any suitable method. For example, processing subsystem 710 may estimate an amount of effort expended by the user when performing the motion based on motion data provided by tracking module 755. For example, tracking module 755 may determine motion data including a linear velocity, a linear acceleration, a rotational velocity, a rotational acceleration, or a combination thereof of a body part of the user. Processing subsystem 710 may receive the motion data from sensors in HMD 705 as described in detail below. Processing subsystem 710 may use the motion data to estimate the effort expended by the user and determine a haptic profile for conveying a perceived physical sensation of the estimated expended effort to the user. The estimated effort expended by the user may include the estimated physical effort expended by the user when performing the motion. The estimated effort expended may include a perceived exertion by the user resulting from the integration of different inputs to the central nervous system of the user. These inputs may include afferent nerve feedback from the skeletal muscles that the user would experience if actually performing the motion. Estimating the expended effort by the user in a virtual environment may include processing subsystem 710 computing an effort estimation based on a physiological model of the user (e.g., a general physiological model of the user, a trained physiological model, and/or a personal physiological model of the user) and the motion data (e.g., linear velocity, linear acceleration, rotational velocity, rotational acceleration, of a body part (e.g., a hand) of the user).

As described above with reference to FIG. 6, the haptic device may include neuromuscular sensors (e.g., electromyography (EMG) sensors). The neuromuscular sensors may produce neuromuscular signal data that may be used to determine a musculoskeletal position and/or motion of the user. Additionally or alternatively, estimating the effort expended by the user in performing a motion may be based on the musculoskeletal position/motion of the user.

Processing subsystem 710 may determine the haptic profile and transmit the haptic profile as a sequence of haptic stimuli to haptic device 780. For example, processing subsystem 710 may choose, based on the estimated effort expended by the user, an amount of force to be applied to the user by haptic device 780 to induce a desired effect (e.g., to induce a sensation perceived by the user). In some examples, the amount of force to be applied to the user by haptic device 780 to induce a desired effect (e.g., to induce a sensation perceived by the user) may be based on any suitable method. For example, processing subsystem 710 may choose a force level and/or the haptic profile by selecting the force level and/or the haptic profile from a table stored in memory that correlates the estimated effort expended by the user to the force level and/or the haptic profile. In some examples, processing subsystem 710 may choose a force level and/or the haptic profile by computing the force level and/or the haptic profile based on a model (e.g., a physiological model of the user, a trained physiological model, and/or a personal physiological model of the user).

Haptic device 780 may execute the haptic profile in a manner that is synchronized to the visual content displayed to the user to simulate a sensation of expending the effort. Haptic device 780 may be worn on any part of the user's body (e.g., a wrist, an arm, a leg, etc.) and multiple haptic devices may be worn by the user. Haptic device 780 may execute the haptic profile by applying any type of tactile sensation including, without limitation, a vibration, a force (e.g., a squeeze, a pressure, etc.), or a temperature. Further, haptic device 780 may execute the haptic profile using any type of haptic actuation including, without limitation, a vibrotactile actuator 786, such as an eccentric rotating mass actuator, a linear resonant actuator, a motor driving a spool that tensions a band, or a piezoelectric actuator. Haptic device 780 may apply a variable force(s) to the user when executing the haptic profile. The haptic profile may include different types and/or amounts of tactile sensations and forces to be applied to the user over time and may be synchronized with the visual content viewed by the user.

Tensioning mechanism 785 may be configured to apply a squeezing force to a body part of the user as at least a portion of the haptic profile. The squeezing force may vary over time in a manner that is synchronized with the estimated effort of the detected motion. The squeezing force may be controlled in a closed-loop by measuring the squeezing force (e.g., with force sensor 787) and controlling (e.g., adjusting) the amount of tension applied by the tensioning mechanism that creates the squeezing force. Force sensor 787 may measure the force applied to the user by the tensioning mechanism. Haptic device 780 may include multiple force sensors 787 of multiple types. Force sensor 787 may include the force sensor described below with reference to FIGS. 9-11. Force sensor 787 may be, without limitation, a force sensing resistor, a force sensing capacitor, a series elastic actuator, or a combination thereof. Force sensor 787 may measure the force applied to the user and send force data to a processor for comparison to a force setting. Thus, force sensor 787 may provide feedback to indicate an amount of force the at least one haptic device exerts on the user.

The processor may be processor 788 included in haptic device 780, processing subsystem 710, a server, or other processor in HMD 700. In response to the measured force being below a set threshold, the processor may send a signal to tensioning mechanism 785 to increase the tension, thereby increasing the force. In response to the measured force being above the set threshold, the processor may send a signal to tensioning mechanism 785 to decrease the tension, thereby decreasing the force. The processor may execute the haptic profile by controlling a sensation of force applied to the user over time that simulates the estimated effort expended by the user in performing the motion.

Processing subsystem 710 may include one or more processing devices or physical processors that provide content to HMD device 705 in accordance with information received from one or more of depth-sensing subsystem 720, haptic device 780, image capture subsystem 730, IMU 740, I/O interface 715, and/or handheld controller 770. In the example shown in FIG. 7, processing subsystem 710 may include an image processing engine 760, an application store 750, and a tracking module 755.

Application store 750 may store one or more applications for execution by processing subsystem 710. An application may, in some examples, represent a group of instructions that, when executed by a processor, generates content for presentation to the user. Such content may be generated in response to inputs received from the user via movement of HMD device 705, haptic device 785, and/or handheld controller 770. Examples of such applications may include gaming applications, conferencing applications, video playback applications, productivity applications, social media applications, and/or any other suitable applications.

Tracking module 755 may calibrate HMD system 700 using one or more calibration parameters and may adjust one or more of the calibration parameters to reduce error when determining the position of HMD device 705 and/or handheld controller 770. For example, tracking module 755 may communicate a calibration parameter to depth-sensing subsystem 720 to adjust the focus of depth-sensing subsystem 720 to more accurately determine positions of structured light elements captured by depth-sensing subsystem 720. Calibration performed by tracking module 755 may also account for information received from IMU 740 in HMD device 705 and/or another IMU 740 included in handheld controller 770. Additionally, if tracking of HMD device 705 is lost or compromised (e.g., if depth-sensing subsystem 720 loses line-of-sight of at least a threshold number of structured light elements), tracking module 755 may recalibrate some or all of HMD system 700.

Tracking module 755 may track movements of HMD device 705 and/or handheld controller 770 using information from depth-sensing subsystem 720, image capture subsystem 730, the one or more position sensors 735, IMU 740, or some combination thereof. For example, tracking module 755 may determine a position of a reference point of HMD device 705 in a mapping of the real-world environment based on information collected with HMD device 705.

In some examples, tracking module 755 may track other features that can be observed by depth-sensing subsystem 720, image capture subsystem 730, and/or another system. For example, tracking module 755 may track one or both of the user's hands so that the location of the user's hands and movement of the user's hands within the real-world environment may be known and utilized. Tracking module 755 may calculate the motion of a body part of the user. For example, tracking module 755 may calculate a linear velocity of the body part of the user, a linear acceleration of the body part of the user, a rotational velocity of the body part of the user, or a rotational acceleration of the body part of the user.

Image processing engine 760 may generate a three-dimensional mapping of the area surrounding some or all of HMD device 705 (i.e., the "local area" or "real-world environment") based on information received from HMD device 705. In some examples, image processing engine 760 may determine depth information for the three-dimensional mapping of the local area based on information received from depth-sensing subsystem 720 that is relevant for techniques used in computing depth. Image processing engine 760 may calculate depth information using one or more techniques in computing depth from structured light. In various embodiments, image processing engine 760 may use the depth information, e.g., to generate and/or update a model of the local area and generate content based in part on the updated model. Image processing engine 760 may also extract aspects of the visual appearance of a scene so that a model of the scene may be more accurately rendered at a later time, as described herein.

Image processing engine 760 may also execute applications within HMD system 700 and receive position information, acceleration information, velocity information, predicted future positions, or some combination thereof, of HMD device 705 from tracking module 755. Based on the received information, image processing engine 760 may identify content to provide to HMD device 705 for presentation to the user in synchronization with a haptic profile executed to convey a perceived physical sensation of expending effort.

Figure 8:
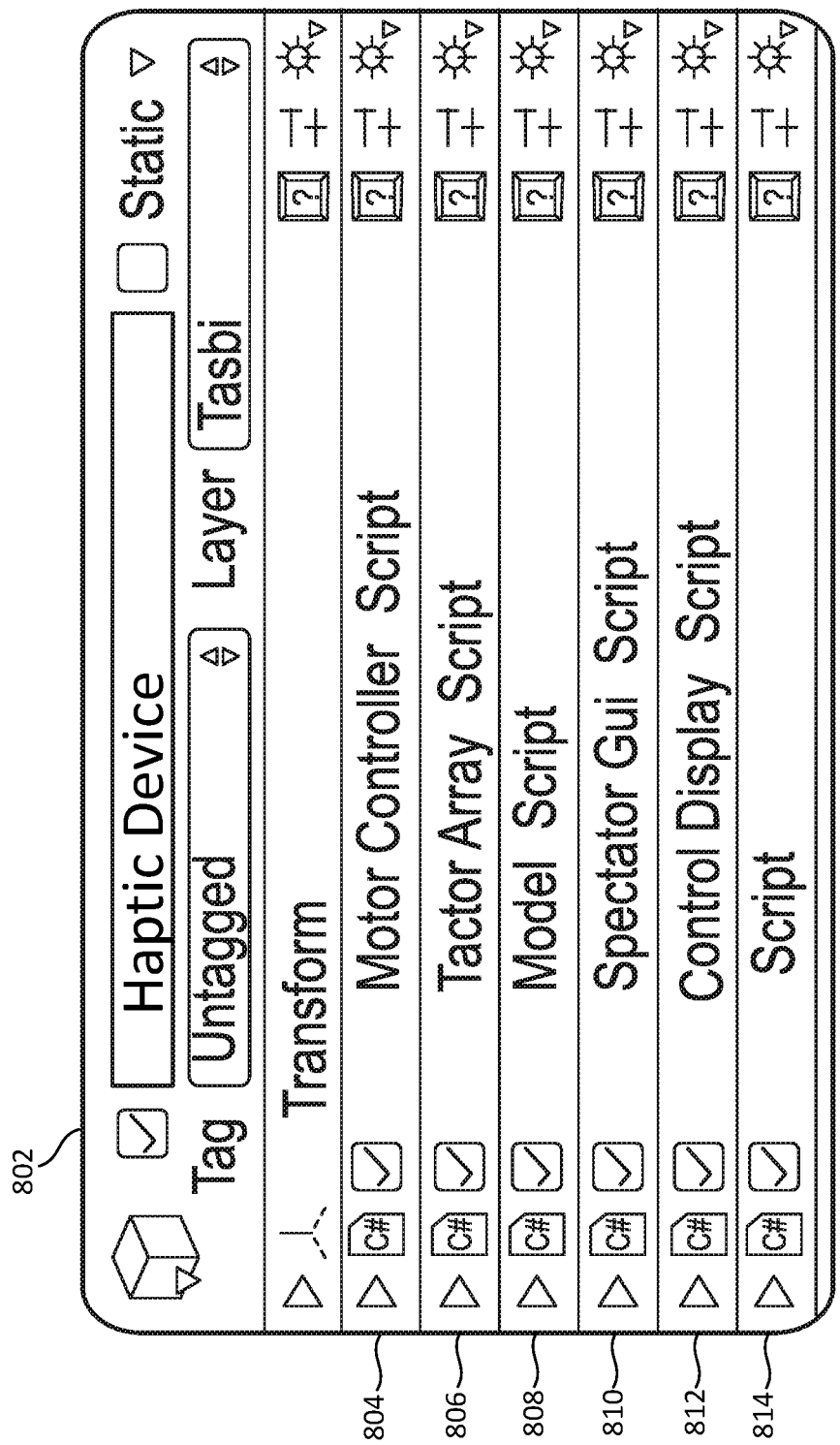
FIG. 8 illustrates a graphical user interface for an application programming interface, according to at least one embodiment of the present disclosure.

FIG. 8 is an illustration of a graphical user interface for an application programming interface (API). Graphical user interface 802 may allow a programmer to program a haptic profile for simulating a sensation of a user expending effort in a virtual environment. Simulating a sensation of a user expending effort in a virtual environment may include a sensory substitution for changing the characteristics of one sensory modality (e.g., feeling the interaction with an object) into stimuli of another sensory modality (e.g., feeling the haptic feedback provided by the haptic profile). The haptic profile may convey the sensation of the user interacting with a virtual object through sensory substitution. The haptic profile programmed using graphical user interface 802 may be executed via a haptic device that is in contact with the user as described with reference to FIG. 7. Graphical user interface 802 may be used as an API to generate a programming language (e.g., high-level C # and/or low-level C++ DLL) for directing the haptic profile. The generated programming language may provide abstraction from the details of the processor that the programming language will run on. In some examples, the generated programming language may run on processing subsystem 710 and/or haptic device 780 when executing the haptic profile. Further, the generated programming language may execute the haptic profile that is synchronized with displaying a visual representation of detected motion of the user.

Graphical user interface 802 may be segmented into various functional areas associated with executing the haptic profile. For example, graphical user interface 802 may include motor controller script 804. Motor controller script 804 may generate a high-level programming language for controlling a motor in a haptic device. Motor controller script 804 may generate high-level programming language and/or executable code for controlling a motor in housing 610 of wearable device 600 in FIG. 6. Motor controller script 804 may control a speed and/or torque on a tensioning mechanism that runs through housing 610 to exert a squeezing force on a user as part of the haptic profile.

Tactor array script 806 may generate a high-level programming language for haptic actuators in a haptic device. Tactor array script 806 may generate high-level programming language and/or executable code for controlling haptic actuators in each of band elements 606. The haptic actuators may include at least one vibrotactor (e.g., at least one vibrotactile actuator) configured to vibrate in unison and/or independently to provide one or more of various types of haptic sensations when executing a haptic profile on the user.

Model script 808 may generate a high-level programming language for a type of haptic device. Model script 808 may generate high-level programming language and/or executable code for selecting attributes associated with a virtual representation of the haptic device. For example, model script 808 may allow a programmer to select attributes including without limitation, a haptic device model type (e.g., a model number), a type of metal material, a type of plastic material, a type of rubber material, a type of tensioning cord material, a type of fastening screw material, or a combination thereof.

Spectator GUI script 810 may generate high-level programming language and/or executable code for viewing a virtual representation of a user performing a motion and/or a contact event (e.g., pressing a button, playing a game, etc.).

Control display script 812 may generate high-level programming language and/or executable code for viewing a virtual representation of a user performing a motion and/or a contact event (e.g., pressing a button, playing a game, etc.) while simultaneously displaying a modified representation of the motion and/or contact event of the user in visual content displayed to the user. The modified representation of the actual motion of the user may include an adjusted range (e.g., an amplified range) of the actual motion of the user as described with reference to FIGS. 3A-4.

Script 814 may be a high-level scripting entry point that allows a programmer to view and edit the programming languages generated by script generators 804-812.

Figure 9:
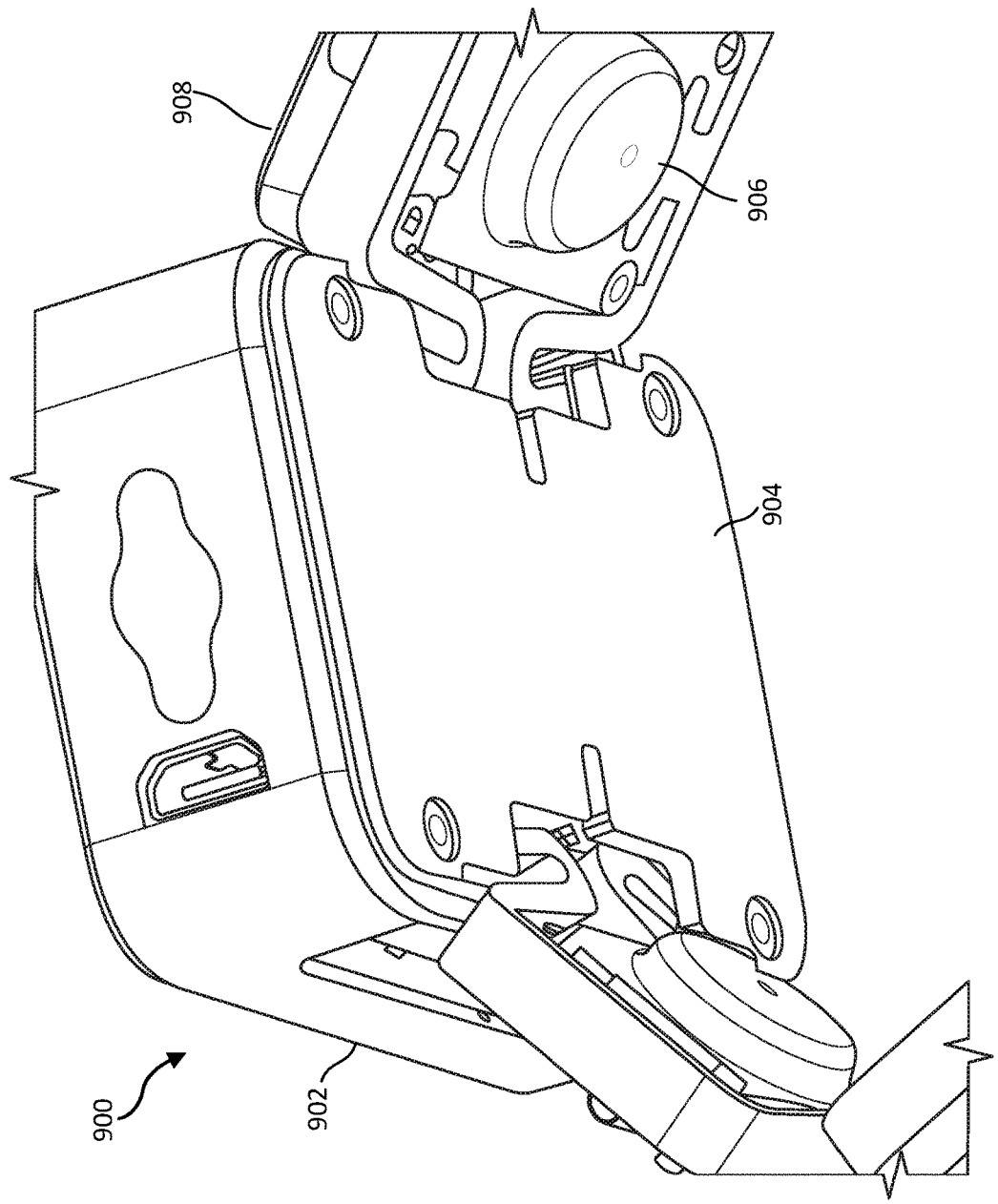
FIG. 9 is a perspective view of example embodiment of a housing of a wearable device, according to at least one embodiment of the present disclosure.

FIG. 9 is a perspective view of an example embodiment of housing 900 of a wearable device. In this embodiment, housing 900 may be a component of a wrist-worn device with an actuator (e.g., a motor) and tensioning mechanism housed therein. Housing 900 may include upper module 902 (e.g., a lid) and force-transfer plate 904 that may be configured and dimensioned to transfer a force the wearable device is exerting on the user to a force sensor disposed in housing 900. The actuator may be seated in such a way that the tensioning mechanism runs substantially through a center of housing 900. In this regard, the tensioning mechanism may run substantially through a center of the wearable device via a slot in housing 900 and along a perimeter of the wearable device relative to a surface of the body part of the user. This configuration may enable housing 900 to be centered on the wearable device such that when a tensioning force is applied to the user, force-transfer plate 904 transfers a force substantially to the center of force-transfer plate 904.

The force may be transferred to the force sensor disposed adjacent to force-transfer plate 904 in housing 900 as described below with reference to FIG. 10.

Housing 900 may also be configured with comparable dimensions of individual band elements 908 in order to perform as band element 908 when the actuator provides substantially tangential movement of the tensioning mechanism. For example, when the actuator pulls the tensioning mechanism tighter about the user's body part, individual band elements 908 may compress about the user's body part. Housing 900 may also compress similarly against the surface of the user's body part. Thus, housing 900 may be configured with force-transfer plate 904 on the surface of housing 900 closest to the user's body part to provide substantially uniform distribution of orthogonal movement of housing 900 relative to the surface of the user body part thereby transferring the force against the user's body part to the force sensor. Housing 900 may include vibrotactor(s) 906. Vibrotactor(s) 906 may provide a haptic stimulus (e.g., a vibration) to a user when a haptic profile is executed on the user.

Figure 10:
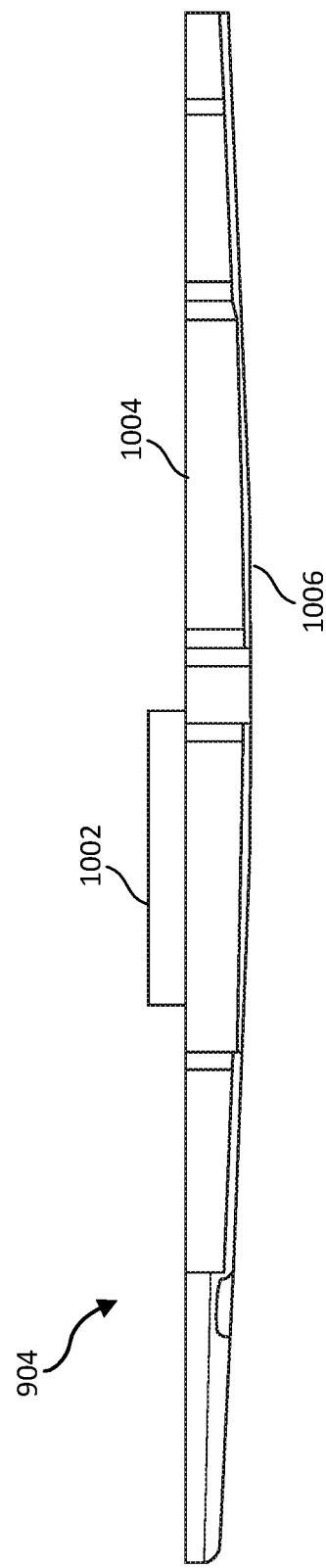
FIG. 10 is a cross-sectional view of a force-transfer plate of a wearable device, according to at least one embodiment of the present disclosure.

FIG. 10 is a cross-sectional view of force-transfer plate 904 of a wearable device. Force-transfer plate 904 may transfer a force exerted on the user by the tensioning mechanism to a force sensor. The force sensor may provide a force measurement to assist in closed-loop control of the force exerted on the user as described with reference to FIG. 7. Force-transfer plate 904 may include a bottom surface 1006 that contacts a surface of the user's body part. Force-transfer plate 904 may include a top surface 1004 that is disposed within housing 900. Top surface 1004 may include tab 1002 disposed on top surface 1004. Force-transfer plate 904 may be constructed of a rigid material such that a force applied substantially orthogonal to a surface of bottom surface 1006 is transferred to tab 1002 disposed on top surface 1004. Tab 1002 may be disposed adjacent to a force sensor in housing 900 such that a force applied substantially orthogonal to a surface of bottom surface 1006 is transferred through tab 1002 to the force sensor. In some examples, bottom surface 1006 may be of a convex shape to assist in transferring the force applied to an uneven surface of the user's body part to tab 1002.

Figure 11:
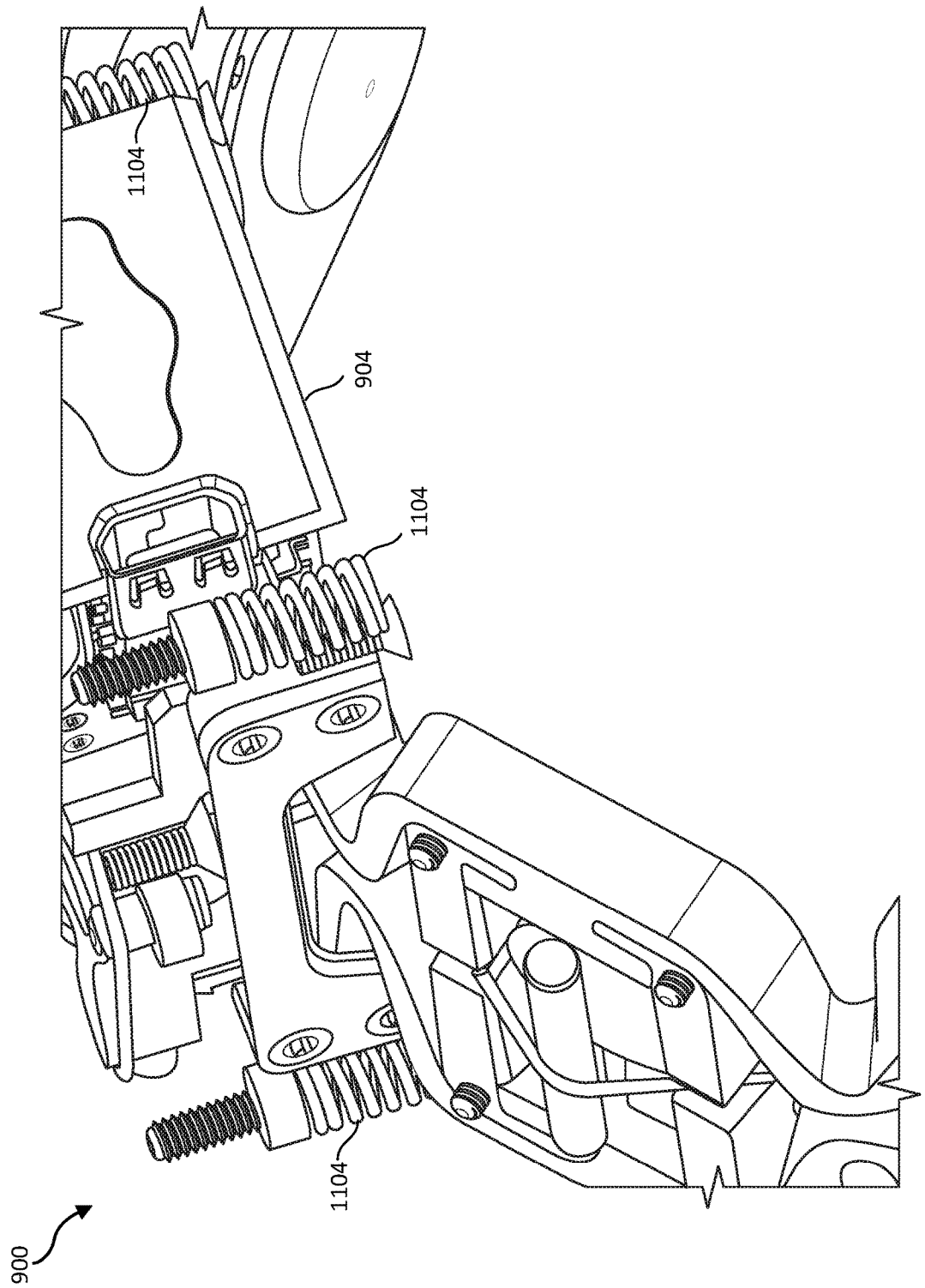
FIG. 11 is a cut-away perspective view of a portion of a housing of a wearable device, according to at least one embodiment of the present disclosure.

FIG. 11 is a cut-away perspective view of a portion of housing 900 of a wearable device. Referring to FIG. 11, housing 900 may include at least one spring 1104. In some examples, housing 900 may include spring 1104 at each of the four corners of housing 900. Spring 1104 may allow movement between force-transfer plate 904 and housing 900 when the actuator (e.g., a motor) pulls the tensioning mechanism tight about the user's body part. For example, when the actuator pulls the tensioning mechanism tight about the user's body part when executing a haptic profile on a user, spring 1104 may compress to allow force-transfer plate 904 to move in towards a cavity inside housing 900. When the actuator releases the tension on the tensioning mechanism about the user's body part when executing the haptic profile, spring 1104 may expand to allow force-transfer plate 904 to move away from the cavity inside housing 900. Spring 1104 may be secured on one end to a frame structure inside housing 900 and secured on an opposite end to force-transfer plate 904.

Figure 12:
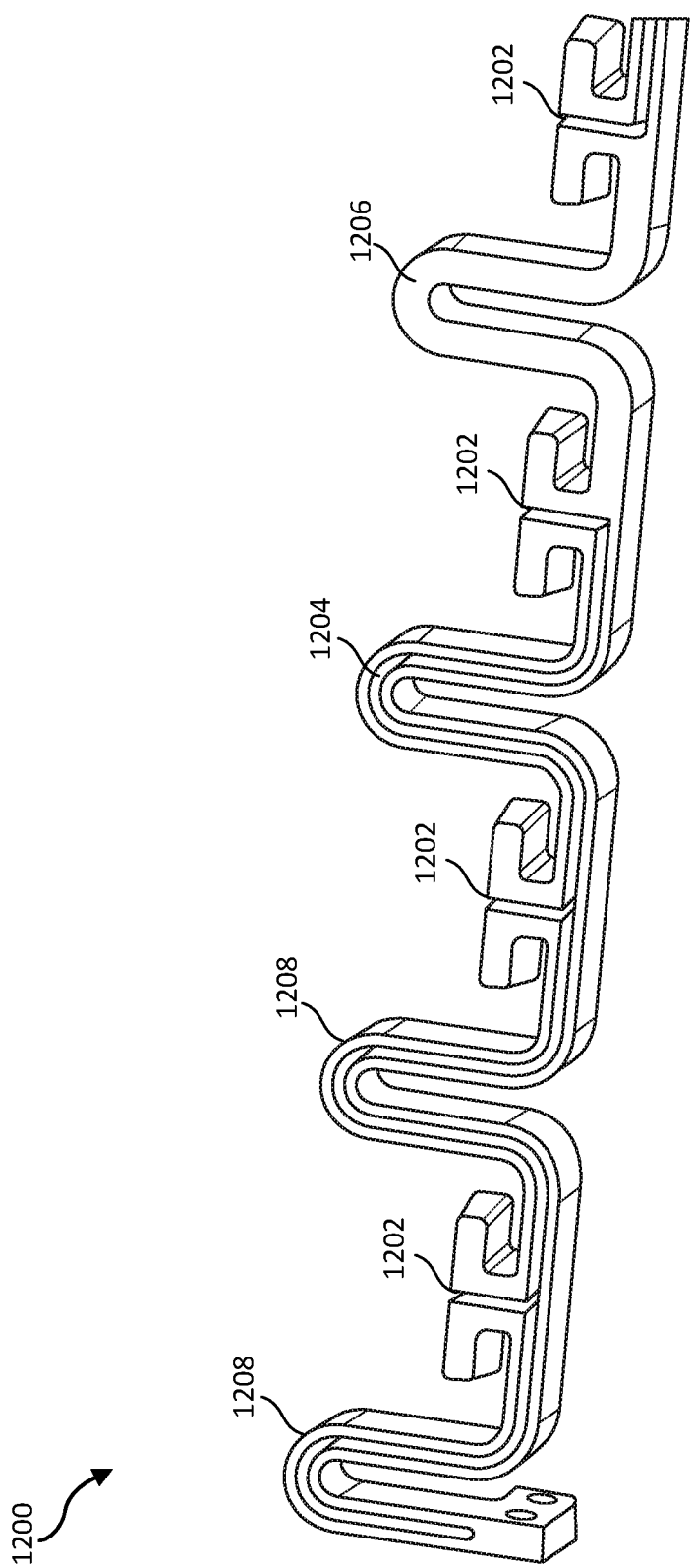
FIG. 12 is a perspective view of an example embodiment of a band element coupling component, according to at least one embodiment of the present disclosure.

FIG. 12 is a perspective view of an example embodiment of a band element coupling component 1200. For example, wearable device 600 of FIG. 6 may include band element coupling component 1200. Band element coupling component 1200 may include a flexible material (e.g., rubber, polyurethane, flexible plastic, or the like) to allow wearable device 600 to bend about the user's wrist. Band element coupling component 1200 may include tapered fastening components 1202 that allow fastening of band element coupling component 1200 to individual band elements (e.g., band elements 606). Fastening components 1202 may be tapered such that the individual band elements may be coupled to band element coupling component 1200 during assembly by sliding the tapered end of fastening components 1202 into a mating groove on the individual band elements that is dimensioned to accept fastening components 1202. The individual band elements may be secured to band element coupling component 1200 by a compression fit of fastening components 1202 in a groove of the individual band elements.

Curvatures 1208 of band element coupling component 1200 may provide separation between the band elements when fastened to band element coupling component 1200. This separation may provide more flexibility in wearable device 600 as the band elements are less likely to align with one another when they are drawn towards one another during execution of a haptic profile. Band element coupling component 1200 may also include an expansion device disposed in groove 1204. The expansion device (e.g., a wire) may have a spring-like function to provide flexible rigidity to the band element coupling component 1200. The expansion device may have a modulus of elasticity such that the band elements may contract towards each other when the tensioning mechanism is actuated and expand away from each other when the tensioning mechanism is released. During assembly of band element coupling component 1200, the expansion device may be inserted into groove 1204 and the groove may be filled in with flexible material 1206 to cover the expansion device.

Figure 13:
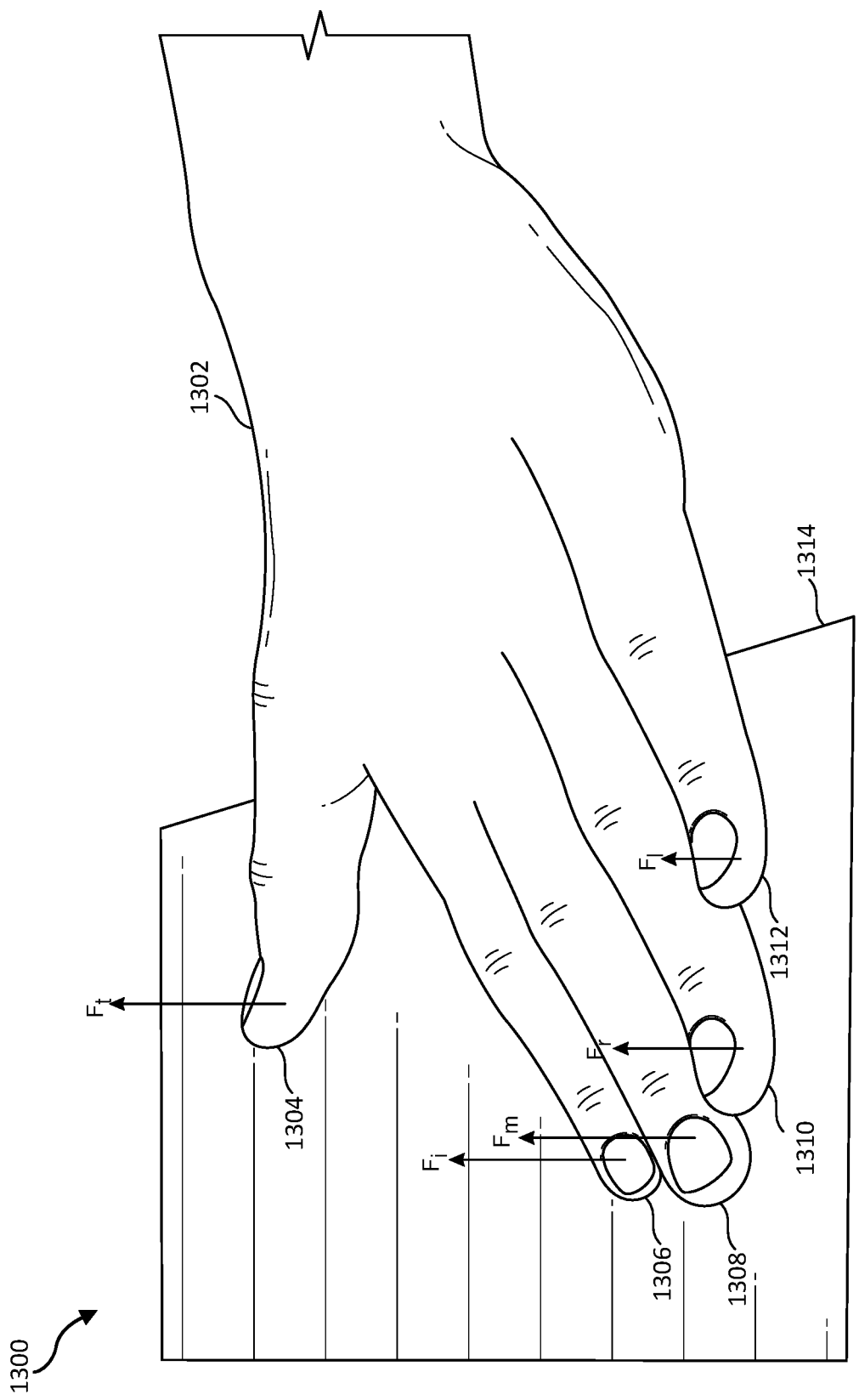
FIG. 13 illustrates a contact event with a world-grounded object by a user in a virtual environment, according to at least one embodiment of the present disclosure.

FIG. 13 illustrates a contact event with a virtual world-grounded object (e.g., a stationary object) by a user in a virtual environment 1300, according to at least one embodiment of the present disclosure. FIG. 13 illustrates a hand 1302 of a user as the user interacts with a visually-rendered, infinitely-stiff virtual surface 1314. Surface 1314 may be visually rendered as a table, a shelf, the ground, etc., and may be displayed to the user on an HMD. The user may interact with virtual surface 1314 by pressing on surface 1314. As described with reference to FIG. 1, a user may desire to experience a perceived physical sensation (e.g., a perceived force sensation) when pressing on surface 1314. The user may desire to experience a perceived force sensation of surface 1314 pushing back on any or all of fingers 1304, 1306, 1308, 1310, or 1312.

The force sensation may be experienced as a perceived physical sensation by the user through a haptic profile executed by a haptic device worn by the user. By way of example and not limitation, the haptic device may include haptic device 204 of FIG. 2, wearable device 620 of FIG. 6, or wearable system 2200 of FIG. 20. The haptic device may be worn on any part of the user's body such as a wrist as the user performs the contact event of pressing on virtual surface 1314. The contact event of the user pressing on surface 1314 may be detected and viewed by the user in virtual environment 1300 as described with reference to FIG. 7. As the user is pressing on surface 1314, the haptic device may execute a haptic profile that allows the user to experience a perceived physical sensation (e.g., a perceived force sensation) of pressing on surface 1314. Although the haptic device may be worn on a wrist of the user, the haptic device may be a multi-sensory haptic device that delivers haptic stimulus to multiple cutaneous sensory channels such that the physical sensation may be experienced (e.g., per-ceived) by the user on another body part (e.g., fingers 1304, 1306, 1308, 1310, or 1312 pressing on surface 1314). In additional embodiments, the haptic stimulus delivered to the user's body part (e.g., wrist) may be perceived at the body part, and the user may learn to associate the sensation at the body part with a virtual action on the other body part (e.g., the finger(s)).

In some examples, the palm of hand 1302 may have minimal interaction with surface 1314 and the resulting net force acting on hand 1302 may be the vector sum of the forces acting on fingers 1304, 1306, 1308, 1310, and 1312. The net force acting on fingers 1304, 1306, 1308, 1310, and 1312 may be determined based on Eq. 1.

$$\vec{F}_h = \Sigma_{p \in S} \vec{F}_p, S \in \{i, m, r, l, t\} \qquad \text{Eq. 1}$$

In Eq. 1, $\vec{F}_h$ is the net external force acting on hand 1302 by the interaction with surface 1314. $\vec{F}_p$ is the force acting on the pth finger. Indices i, m, r, l, and t correspond to index finger 1306, middle finger 1308, ring finger 1310, little finger 1312, and thumb finger 1304, respectively. The forces may be computed according to Eq. 1 by processor 788, HMD 705, processing subsystem 710, or a combination thereof.

In some examples, the squeeze force rendered by the haptic device when executing the haptic profile may be proportional to the resulting force acting on index finger 1306, middle finger 1308, ring finger 1310, little finger 1312, and thumb finger 1304. The squeeze force may be determined based on Eq. 2.

$$F_s = K_s \|\vec{F}_h\| \qquad \text{Eq. 2}$$

In Eq. 2, $K_s$ is a constant used to scale the force acting on index finger 1306, middle finger 1308, ring finger 1310, little finger 1312, and thumb finger 1304. $F_s$ is the squeeze force magnitude rendered at the user's wrist by the haptic device when executing the haptic profile. $\vec{F}_h$ is the net external force acting on hand 1302 by the interaction with surface 1314. The squeeze force magnitude may be computed according to Eq. 2 by processor 788, HMD 705, processing subsystem 710, or a combination thereof.

In some examples, a model may be generated based on Eq. 2 that increases the resolution of the perceived forces (e.g., implied kinesthetic forces) acting on the user's hands as the user manipulates and/or interacts with virtual objects (e.g., pressing fingers on a virtual table). The model may be trained based on a trial of users providing feedback as to the level of perceived forces versus haptic feedback (e.g., a haptic profile) received on a wrist-worn device. For example, users may be subjected to a sensory substitution scenario where the implied kinesthetic forces on the user's hand (e.g., perceived user effort in pressing on the virtual table) are rendered as haptic feedback at the wrist. For example, the user may provide feedback to determine an absolute detection threshold (ADT) and a just noticeable difference (JND) associated with the perceived user effort. The ADT may determine the lowest amount of haptic feedback to the user that the user is able to detect as a perceived force in the hand. The ADT may represent the lowest amount of squeeze force at the wrist necessary to feel a virtual surface contact at the finger(s) for different levels of $K_s$. The JND may determine the minimum change in haptic feedback at the wrist that the user is able to discriminate as a change in perceived user effort (e.g., force) in the hand as the user presses on a virtual object (e.g., a virtual table). The ADT and JND may be used to develop a high-resolution model that maps the haptic feedback at the wrist to the perceived user effort in the hand.

Figure 14:
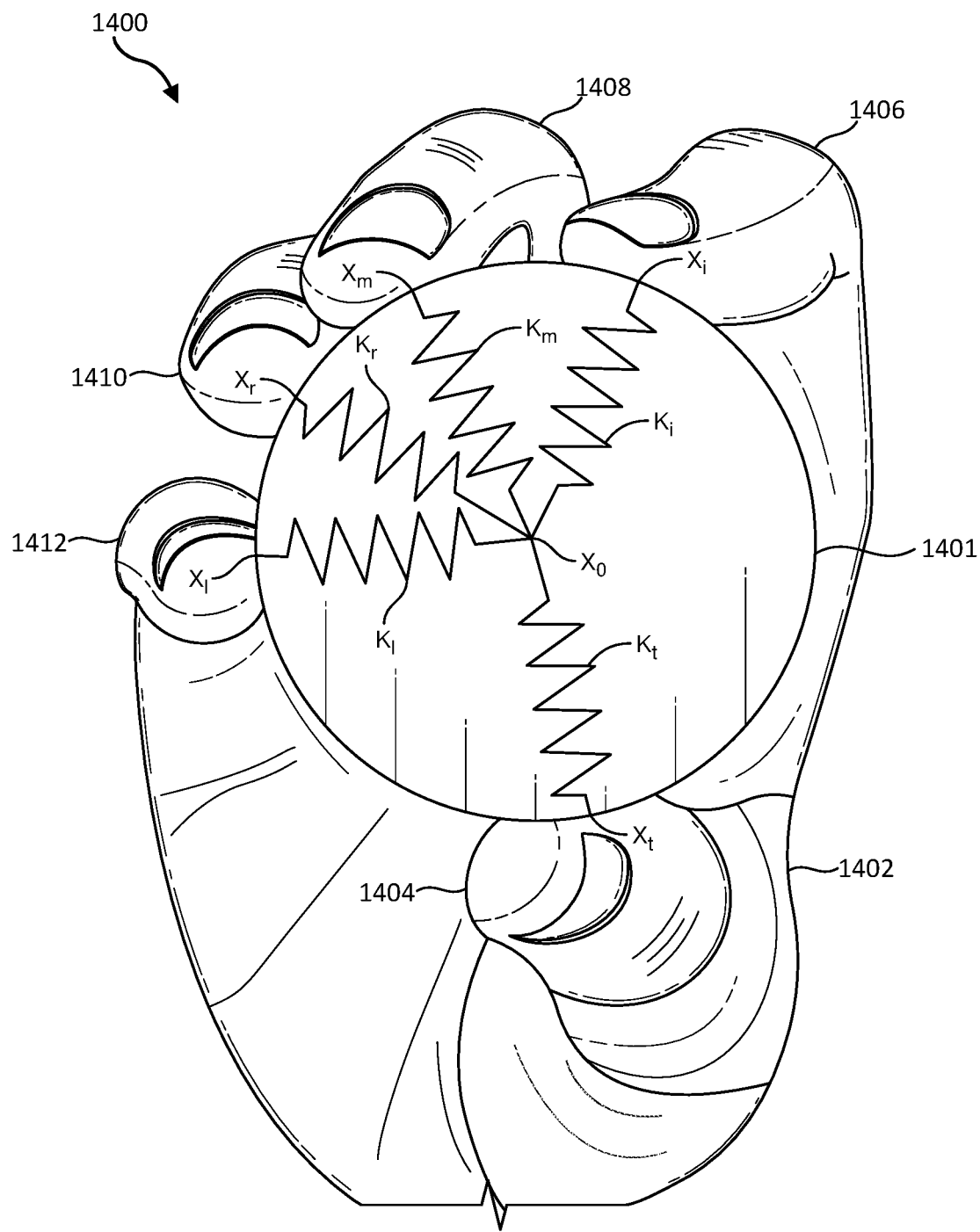
FIG. 14 illustrates a contact event with a compressive object by a user in a virtual environment, according to at least one embodiment of the present disclosure.

FIG. 14 illustrates a contact event with a virtual compressible object 1401 by a user in a virtual environment 1400, according to at least one embodiment of the present disclosure. FIG. 14 illustrates a hand 1402 of a user as the user interacts (e.g., squeezes, manipulates) with a visually rendered, compressible object 1401. Compressible object 1401 may be visually rendered by an HMD as a squeeze ball. As described with reference to FIG. 1, a user may desire to experience a perceived physical sensation (e.g., a perceived force sensation) when squeezing virtual compressible object 1401. The user may desire to experience the perceived force sensation of compressible object 1401 pushing back on any or all of fingers 1304, 1306, 1308, 1310, or 1312 as the user's hand 1402 executes a squeezing motion in virtual environment 1400.

The force sensation may be experienced as a perceived physical sensation by the user through a haptic profile executed by a haptic device worn by the user. The haptic device may include haptic device 204 of FIG. 2, wearable device 620 of FIG. 6, or wearable system 2200 of FIG. 20.

The haptic device may be worn on any part of the user's body such as a wrist as the user performs the contact event of squeezing compressible object 1401. The contact event of the user squeezing compressible object 1401 may be detected and viewed by the user in virtual environment 1400 as described with reference to FIG. 7. As the user is squeezing compressible object 1401, the haptic device may execute a haptic profile that allows the user to experience a perceived physical sensation (e.g., a perceived force sensation) of squeezing compressible object 1401. Although the haptic device may be worn on a wrist of the user, the haptic device may be a multi-sensory haptic device that delivers haptic stimulus to multiple cutaneous sensory channels such that the physical sensation may be experienced (e.g., perceived) by the user on another body part (e.g., fingers 1404, 1406, 1408, 1410, and/or 1412 squeezing compressible object 1401). In additional embodiments, the haptic stimulus delivered to the user's body part (e.g., wrist) may be perceived at the body part, and the user may learn to associate the sensation at the body part with a virtual action on the other body part (e.g., the finger(s)).

The forces perceived on fingers 1404, 1406, 1408, 1410, and/or 1412 may be modeled as spring forces. The model may include five forces $K_i$, $K_m$, $K_r$, $K_l$, and $K_t$, corresponding to index finger 1406, middle finger 1408, ring finger 1410, little finger 1412, and thumb finger 1404, respectively. Each virtual spring may have a stiffness and may be connected from the tip of each respective finger to the center $X_0$ of virtual compressible object 1401. The perceived force (e.g., an implied kinesthetic force) rendered at each finger may be equal to the spring force experienced by each finger while squeezing compressible object 1401. The force rendered on the wrist by the haptic device may be a function of the internal force experienced by compressible object 1401.

In some examples, compressible object 1401 is stationary when being compressed and therefore the net force acting on compressible object 1401 is zero and may be determined based on Eq. 3. The forces may be computed according to Eq. 3 by processor 788, HMD 705, processing subsystem 710, or a combination thereof.

$$\Sigma_{p \in S} K_p(\vec{x}_p - \vec{x}_o) = 0, S \in \{i, m, r, l, t\} \qquad \text{Eq. 3}$$

In Eq. 3, $K_p$ is the virtual spring stiffness connecting the pth fingertip ($x_p$) to the virtual object center $X_0$, where p=i, m, r, l, t.

In some examples, rearranging Eq. 3 as Eq. 4 may show that the internal force experienced by compressible object 1401 is equal to the force experienced by thumb finger 1404 ($x_t$) in an opposition grasp of compressible object 1401.

$$K_t(\vec{x}_t - \vec{x}_o) = -\Sigma_{p \in Z} K_p(\vec{x}_p - \vec{x}_o), Z \in \{i, m, r, l\} \qquad \text{Eq. 4}$$

In some examples, the squeeze force rendered by the haptic device when executing the haptic profile may be proportional to the force experienced by the thumb finger 1404 in the virtual environment. The squeeze force may be determined based on Eq. 5. The squeeze force may be computed according to Eq. 5 by processor 788, HMD 705, processing subsystem 710, or a combination thereof.

$$F_s = K_s \|\vec{x}_t - \vec{x}_o\| \qquad \text{Eq. 5}$$

In Eq. 5, $K_s$ is a constant used to scale the force acting on index finger 1306, middle finger 1308, ring finger 1310, little finger 1312, and thumb finger 1304. $F_s$ is the squeeze force magnitude rendered at the user's wrist by the haptic device. The squeeze force magnitude may be computed according to Eq. 5 by processor 788, HMD 705, processing subsystem 710, or a combination thereof.

In some examples, a model may be generated based on Eq. 5 that increases the resolution of the perceived forces (e.g., implied kinesthetic forces) acting on the user's hands as the user manipulates and/or interacts with virtual objects (e.g., fingers squeezing a compressible ball). The model may be trained based on a trial of users providing feedback as to the level of perceived forces versus haptic feedback (e.g., a haptic profile) received on a wrist-worn device. For example, users may be subjected to a sensory substitution scenario where the implied kinesthetic forces on the user's hand (e.g., perceived user effort in squeezing a virtual compressible ball) are rendered as haptic feedback at the wrist. As discussed above, the users may provide feedback to determine an ADT and a JND associated with the perceived user effort. The ADT and JND may be used to develop a high-resolution model that maps the haptic feedback at the wrist to the perceived user effort in the hand associated with squeezing a compressible ball in a virtual environment.

Figure 15:
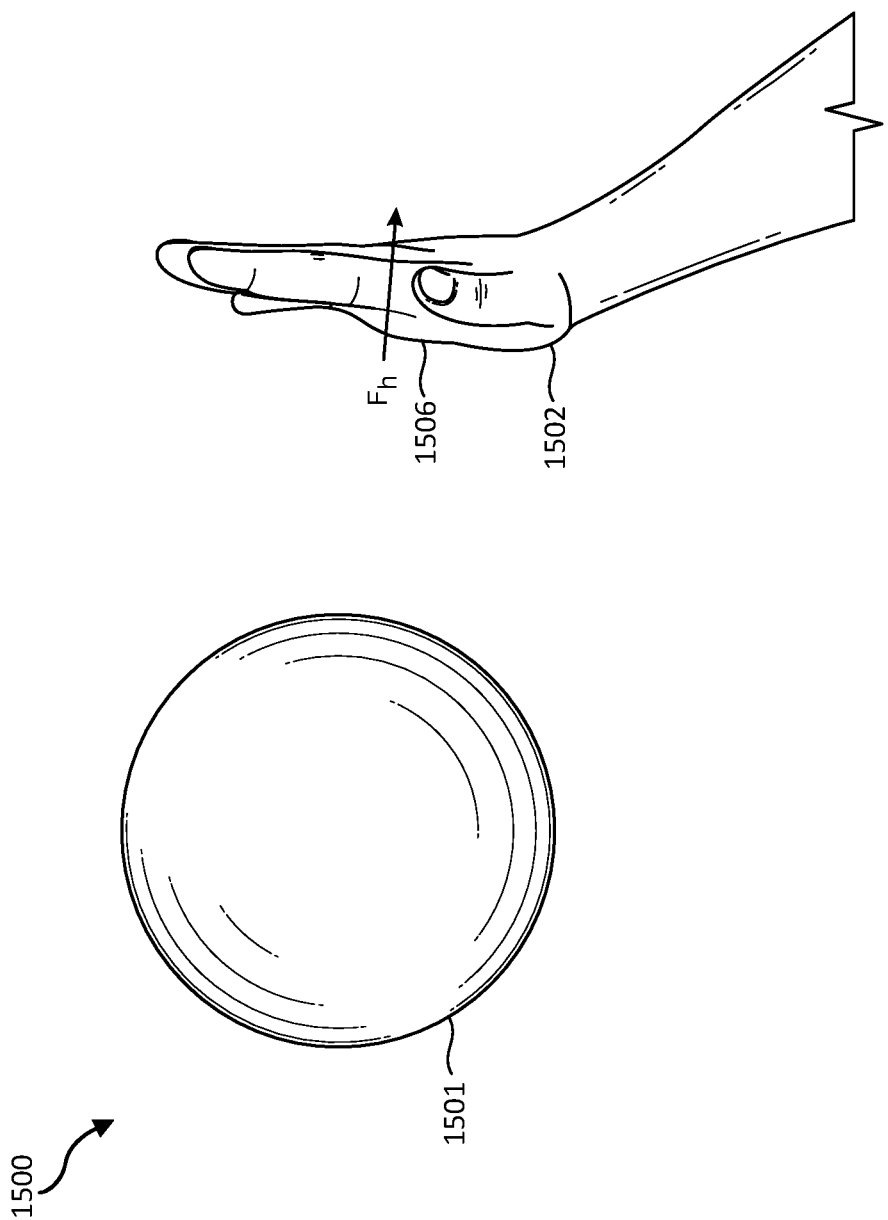
FIG. 15 illustrates an impact event with a virtual object by a user in a virtual environment, according to at least one embodiment of the present disclosure.

FIG. 15 illustrates a contact event (e.g., an impact event) with a virtual object by a user in a virtual environment 1500, according to at least one embodiment of the present disclosure. FIG. 15 illustrates a hand 1502 of a user as the user anticipates an interaction with a visually rendered object 1501. Object 1501 may be visually rendered by an HMD as a ball. As described with reference to FIG. 1, a user may desire to experience a perceived physical sensation (e.g., a perceived force sensation) when impacting (e.g., hitting, striking) object 1501. The user may desire to experience the perceived force sensation of object 1501 impacting palm 1506 as the user's virtual hand 1502 executes an impact motion in virtual environment 1500.

The force sensation may be experienced as a perceived physical sensation by the user through a haptic profile executed by a haptic device worn by the user. By way of example and not limitation, the haptic device may include haptic device 204 of FIG. 2, wearable device 620 of FIG. 6, or wearable system 2200 of FIG. 20. The haptic device may be worn on any part of the user's body such as a wrist as the user performs the contact event of impacting object 1501. The contact event of the user impacting object 1501 may be detected and viewed by the user in virtual environment 1500 as described with reference to FIG. 7. As the user impacts object 1501, the haptic device may execute a haptic profile that allows the user to experience a perceived physical sensation (e.g., a perceived force sensation) of impacting object 1501 with palm 1506 of hand 1502. Although the haptic device may be worn on a wrist of the user, the haptic device may be a multi-sensory haptic device that delivers haptic stimulus to multiple cutaneous sensory channels such that the physical sensation may be experienced (e.g., perceived) by the user on another body part (e.g., palm 1506) when impacting object 1501.

The forces perceived on palm 1506 may be determined based on Eq. 6. The forces may be computed according to Eq. 6 by processor 788, HMD 705, processing subsystem 710, or a combination thereof.

$$F_s = K_s \|F_h\| \qquad \text{Eq. 6}$$

In Eq. 6, $K_s$ is a constant used to scale the perceived force acting on palm 1506. $F_s$ is the squeeze force magnitude rendered at the user's wrist by the haptic device. $F_h$ is the perceived force experienced by palm 1506. The squeeze force magnitude $F_s$ may be computed according to Eq. 6 by processor 788, HMD 705, processing subsystem 710, or a combination thereof. In addition to the squeeze force provided by the haptic device, the haptic profile may include haptic feedback from vibrotactors (e.g., vibrotactors 906 of FIG. 9). The timing of the vibrotactile feedback may be controlled to provide a realistic perceived impact to palm 1506. In some examples, the timing of the vibrotactile feedback may be rendered as a decaying sinusoid vibrotactile profile. The squeeze force rendered at the wrist according to Eq. 6 may be synchronized with the vibrations rendered by the vibrotactors on the haptic device and/or visual content presented to the user via an HMD. The magnitude of the vibrations may be proportional to the impact force acting on palm 1506.

In some examples, a model may be generated based on Eq. 6 that increases the resolution of the perceived forces (e.g., implied kinesthetic forces) acting on the user's hands as the user manipulates and/or interacts with virtual objects (e.g., hitting a virtual ball with a palm). The model may be trained based on a trial of users providing feedback as to the level of perceived forces versus haptic feedback (e.g., a haptic profile) received on a wrist-worn device. For example, users may be subjected to a sensory substitution scenario where the implied kinesthetic forces on the user's palm (e.g., perceived user effort in hitting a virtual ball) are rendered as haptic feedback at the wrist. As discussed above, the users may provide feedback to determine an ADT and a JND associated with the perceived user effort. The ADT and JND may be used to develop a high-resolution model that maps the haptic feedback at the wrist to the perceived user effort in the hand associated with hitting a virtual ball.

Figure 16:
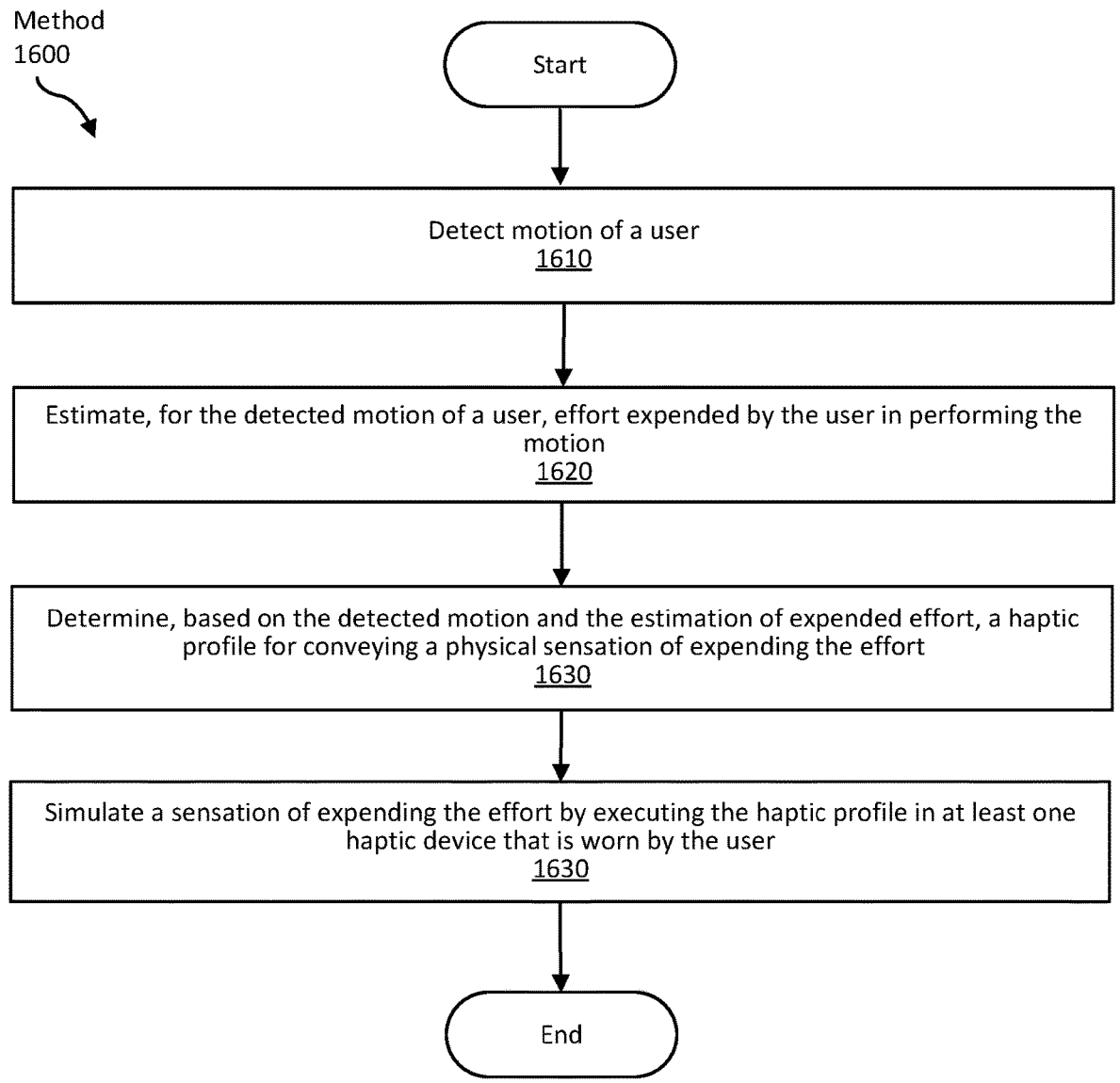
FIG. 16 is a flowchart of a method of mapping a haptic stimulus to a perceived effort, according to at least one embodiment of the present disclosure.

FIG. 16 is a flowchart of a method of mapping a haptic stimulus to a perceived effort. By way of example, the mapping of the haptic stimulus to the perceived effort may be performed to determine an appropriate haptic profile (e.g., including the application of forces) for application to a user with one or more haptic devices to induce the user to perceive a physical sensation of expending effort that may correspond to an action of the user in a virtual environment.

As shown in FIG. 16, the method 1600 may include, at step 1610, detecting motion of a user. Step 1610 may be performed in a variety of ways. For example, an image capture system (e.g., image capture subsystem 730) and/or an IMU may detect motion of the hands or other body part of a user.

At step 1620, the method 1600 may include estimating, for the detected motion of a user, effort expended by the user in performing the motion. Step 1620 may be performed in a variety of ways. For example, estimating an effort expended by the user in performing the motion may be based on inertial data captured by an IMU during the motion. Estimating an effort expended by the user may include calculating a linear velocity of a body part of the user, calculating a linear acceleration of the body part of the user, calculating a rotational velocity of the body part of the user, and/or calculating a rotational acceleration of the body part of the user. In some examples, estimating effort expended by the user in performing the motion may be based on neuromuscular signal data captured by neuromuscular sensors.

At step 1630, the method 1600 may include determining, based on the detected motion and the estimation of expended effort, a haptic profile for conveying a perceived physical sensation of expending the effort. Step 1630 may be performed in a variety of ways. For example, determining a haptic profile for conveying a perceived physical sensation may be based on Eqs. 1-6 as described with reference to FIGS. 13-15. The haptic profile may include a pattern of vibrotactor activation, a pattern of tensioning mechanism and corresponding actuator activation, a combination thereof, etc.

At step 1640, the method 1600 may include simulating a sensation of expending the effort by executing the haptic profile in at least one haptic device that is worn by the user. Step 1640 may be performed in a variety of ways. For example, executing the haptic profile may be based on the devices and methods described with reference to FIGS. 6-11, 22A, 22B, and 23.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some examples, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1700 in FIG. 17) or that visually immerses a user in an artificial reality (such as, e.g., virtual-reality system 1800 in FIG. 18). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 17:
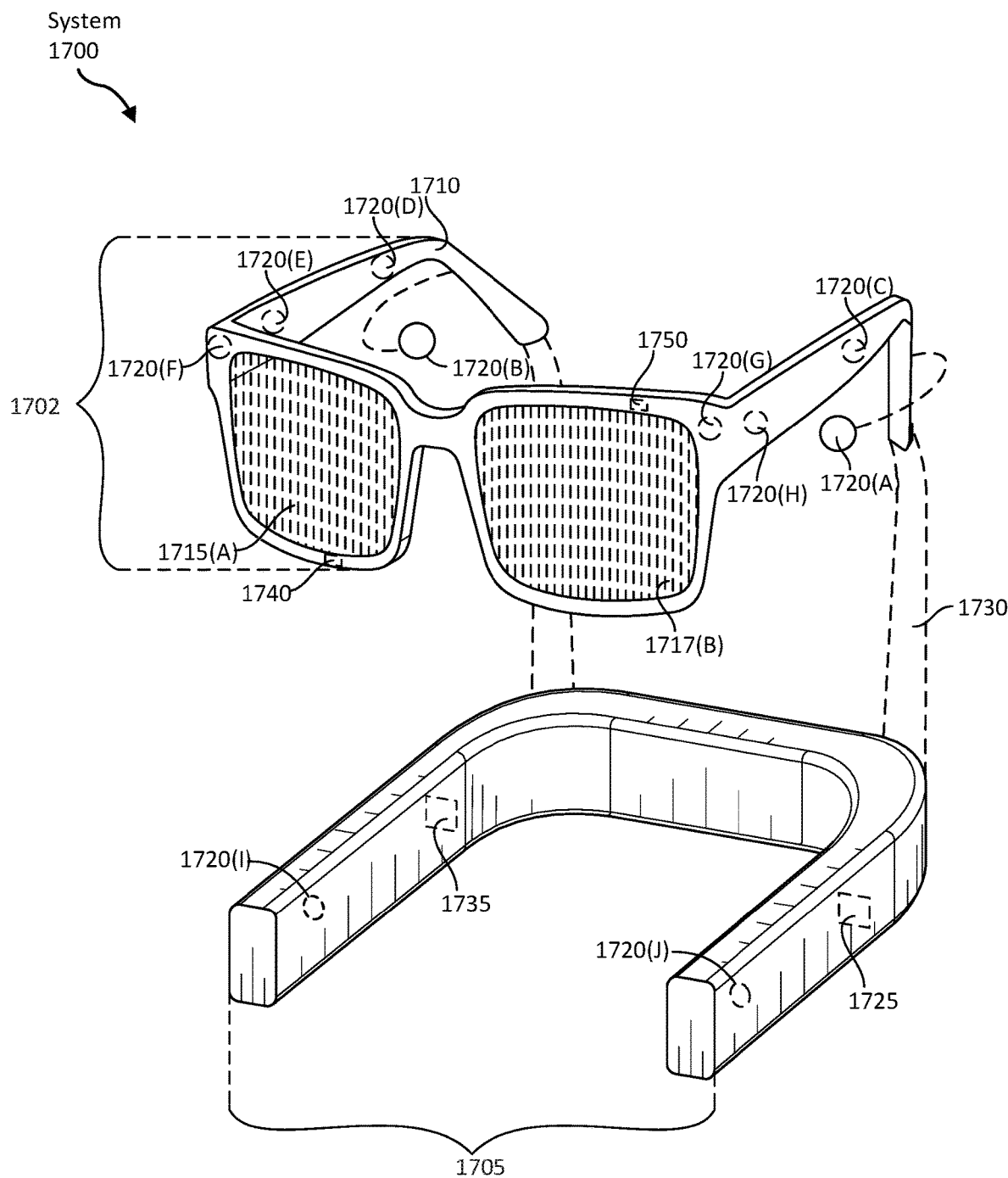
FIG. 17 is an illustration of exemplary augmented-reality glasses that may be used in connection with embodiments of this disclosure.

Turning to FIG. 17, augmented-reality system 1700 may include an eyewear device 1702 with a frame 1710 configured to hold a left display device 1715(A) and a right display device 1715(B) in front of a user's eyes. Display devices 1715(A) and 1715(B) may act together or independently to present an image or series of images to a user. While augmented-reality system 1700 includes two displays, embodiments of this disclosure may be implemented in augmented-reality systems with a single NED or more than two NEDs.

In some examples, augmented-reality system 1700 may include one or more sensors, such as sensor 1740. Sensor 1740 may generate measurement signals in response to motion of augmented-reality system 1700 and may be located on substantially any portion of frame 1710. Sensor 1740 may represent one or more of a variety of different sensing mechanisms, such as a position sensor, an inertial measurement unit (IMU), a depth camera assembly, a structured light emitter and/or detector, or any combination thereof. In some examples, augmented-reality system 1700 may or may not include sensor 1740 or may include more than one sensor. In embodiments in which sensor 1740 includes an IMU, the IMU may generate calibration data based on measurement signals from sensor 1740. Examples of sensor 1740 may include, without limitation, accelerometers, gyroscopes, magnetometers, other suitable types of sensors that detect motion, sensors used for error correction of the IMU, or some combination thereof.

In some examples, augmented-reality system 1700 may also include a microphone array with a plurality of acoustic transducers 1720(A)-1720(J), referred to collectively as acoustic transducers 1720. Acoustic transducers 1720 may represent transducers that detect air pressure variations induced by sound waves. Each acoustic transducer 1720 may be configured to detect sound and convert the detected sound into an electronic format (e.g., an analog or digital format). The microphone array in FIG. 17 may include, for example, ten acoustic transducers: 1720(A) and 1720(B), which may be designed to be placed inside a corresponding ear of the user, acoustic transducers 1720(C), 1720(D), 1720(E), 1720(F), 1720(G), and 1720(H), which may be positioned at various locations on frame 1710, and/or acoustic transducers 1720(I) and 1720(J), which may be positioned on a corresponding neckband 1705.

In some examples, one or more of acoustic transducers 1720(A)-(J) may be used as output transducers (e.g., speakers). For example, acoustic transducers 1720(A) and/or 1720(B) may be earbuds or any other suitable type of headphone or speaker.

The configuration of acoustic transducers 1720 of the microphone array may vary. While augmented-reality system 1700 is shown in FIG. 17 as having ten acoustic transducers 1720, the number of acoustic transducers 1720 may be greater or less than ten. In some examples, using higher numbers of acoustic transducers 1720 may increase the amount of audio information collected and/or the sensitivity and accuracy of the audio information. In contrast, using a lower number of acoustic transducers 1720 may decrease the computing power required by an associated controller 1750 to process the collected audio information. In addition, the position of each acoustic transducer 1720 of the microphone array may vary. For example, the position of an acoustic transducer 1720 may include a defined position on the user, a defined coordinate on frame 1710, an orientation associated with each acoustic transducer 1720, or some combination thereof.

Acoustic transducers 1720(A) and 1720(B) may be positioned on different parts of the user's ear, such as behind the pinna, behind the tragus, and/or within the auricle or fossa. Or, there may be additional acoustic transducers 1720 on or surrounding the ear in addition to acoustic transducers 1720 inside the ear canal. Having an acoustic transducer 1720 positioned next to an ear canal of a user may enable the microphone array to collect information on how sounds arrive at the ear canal. By positioning at least two of acoustic transducers 1720 on either side of a user's head (e.g., as binaural microphones), augmented-reality device 1700 may simulate binaural hearing and capture a 3D stereo sound field around about a user's head. In some examples, acoustic transducers 1720(A) and 1720(B) may be connected to augmented-reality system 1700 via a wired connection 1730, and in other embodiments acoustic transducers 1720 (A) and 1720(B) may be connected to augmented-reality system 1700 via a wireless connection (e.g., a Bluetooth connection). In still other embodiments, acoustic transducers 1720(A) and 1720(B) may not be used at all in conjunction with augmented-reality system 1700.

Acoustic transducers 1720 on frame 1710 may be positioned in a variety of different ways, including along the length of the temples, across the bridge, above or below display devices 1715(A) and 1715(B), or some combination thereof. Acoustic transducers 1720 may also be oriented such that the microphone array is able to detect sounds in a wide range of directions surrounding the user wearing the augmented-reality system 1700. In some examples, an optimization process may be performed during manufacturing of augmented-reality system 1700 to determine relative positioning of each acoustic transducer 1720 in the microphone array.

In some examples, augmented-reality system 1700 may include or be connected to an external device (e.g., a paired device), such as neckband 1705. Neckband 1705 generally represents any type or form of paired device. Thus, the following discussion of neckband 1705 may also apply to various other paired devices, such as charging cases, smart watches, smart phones, wrist bands, other wearable devices, hand-held controllers, tablet computers, laptop computers, other external compute devices, etc.

As shown, neckband 1705 may be coupled to eyewear device 1702 via one or more connectors. The connectors may be wired or wireless and may include electrical and/or non-electrical (e.g., structural) components. In some cases, eyewear device 1702 and neckband 1705 may operate independently without any wired or wireless connection between them. While FIG. 17 illustrates the components of eyewear device 1702 and neckband 1705 in example locations on eyewear device 1702 and neckband 1705, the components may be located elsewhere and/or distributed differently on eyewear device 1702 and/or neckband 1705. In some examples, the components of eyewear device 1702 and neckband 1705 may be located on one or more additional peripheral devices paired with eyewear device 1702, neckband 1705, or some combination thereof.

Pairing external devices, such as neckband 1705, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1700 may be provided by a paired device or shared between a paired device and an eyewear device, thus reducing the weight, heat profile, and form factor of the eyewear device overall while still retaining desired functionality. For example, neckband 1705 may allow components that would otherwise be included on an eyewear device to be included in neckband 1705 since users may tolerate a heavier weight load on their shoulders than they would tolerate on their heads. Neckband 1705 may also have a larger surface area over which to diffuse and disperse heat to the ambient environment. Thus, neckband 1705 may allow for greater battery and computation capacity than might otherwise have been possible on a stand-alone eyewear device. Since weight carried in neckband 1705 may be less invasive to a user than weight carried in eyewear device 1702, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1705 may be communicatively coupled with eyewear device 1702 and/or to other devices. These other devices may provide certain functions (e.g., tracking, localizing, depth mapping, processing, storage, etc.) to augmented-reality system 1700. In the embodiment of FIG. 17, neckband 1705 may include two acoustic transducers (e.g., 1720(1) and 1720(J)) that are part of the microphone array (or potentially form their own microphone subarray). Neckband 1705 may also include a controller 1725 and a power source 1735.

Acoustic transducers 1720(1) and 1720(J) of neckband 1705 may be configured to detect sound and convert the detected sound into an electronic format (analog or digital). In the embodiment of FIG. 17, acoustic transducers 1720(1) and 1720(J) may be positioned on neckband 1705, thereby increasing the distance between the neckband acoustic transducers 1720(1) and 1720(J) and other acoustic transducers 1720 positioned on eyewear device 1702. In some cases, increasing the distance between acoustic transducers 1720 of the microphone array may improve the accuracy of beamforming performed via the microphone array. For example, if a sound is detected by acoustic transducers 1720(C) and 1720(D) and the distance between acoustic transducers 1720(C) and 1720(D) is greater than, e.g., the distance between acoustic transducers 1720(D) and 1720(E), the determined source location of the detected sound may be more accurate than if the sound had been detected by acoustic transducers 1720(D) and 1720(E).

Controller 1725 of neckband 1705 may process information generated by the sensors on neckband 1705 and/or augmented-reality system 1700. For example, controller 1725 may process information from the microphone array that describes sounds detected by the microphone array. For each detected sound, controller 1725 may perform a direction-of-arrival (DOA) estimation to estimate a direction from which the detected sound arrived at the microphone array. As the microphone array detects sounds, controller 1725 may populate an audio data set with the information. In embodiments in which augmented-reality system 1700 includes an inertial measurement unit, controller 1725 may compute all inertial and spatial calculations from the IMU located on eyewear device 1702. A connector may convey information between augmented-reality system 1700 and neckband 1705 and between augmented-reality system 1700 and controller 1725. The information may be in the form of optical data, electrical data, wireless data, or any other transmittable data form. Moving the processing of information generated by augmented-reality system 1700 to neckband 1705 may reduce weight and heat in eyewear device 1702, making it more comfortable to the user.

Power source 1735 in neckband 1705 may provide power to eyewear device 1702 and/or to neckband 1705. Power source 1735 may include, without limitation, lithium ion batteries, lithium-polymer batteries, primary lithium batteries, alkaline batteries, or any other form of power storage. In some cases, power source 1735 may be a wired power source. Including power source 1735 on neckband 1705 instead of on eyewear device 1702 may help better distribute the weight and heat generated by power source 1735.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1800 in FIG. 18, that mostly or completely covers a user's field of view. Virtual-reality system 1800 may include a front rigid body 1802 and a band 1804 shaped to fit around a user's head. Virtual-reality system 1800 may also include output audio transducers 1806(A) and 1806(B). Furthermore, while not shown in FIG. 18, front rigid body 1802 may include one or more electronic elements, including one or more electronic displays, one or more inertial measurement units (IMUS), one or more tracking emitters or detectors, and/or any other suitable device or system for creating an artificial-reality experience.

Artificial-reality systems may include a variety of types of visual feedback mechanisms. For example, display devices in augmented-reality system 1700 and/or virtual-reality system 1800 may include one or more liquid crystal displays (LCDs), light emitting diode (LED) displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., conventional concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1700 and/or virtual-reality system 1800 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1700 and/or virtual-reality system 1800 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some examples, a single transducer may be used for both audio input and audio output.

In some examples, the artificial-reality systems described herein may also include tactile (e.g., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

As noted, artificial-reality systems 1700 and 1800 may be used with a variety of other types of devices to provide a more compelling artificial-reality experience. These devices may be haptic interfaces with transducers that provide haptic feedback and/or that collect haptic information about a user's interaction with an environment. The artificial-reality systems disclosed herein may include various types of haptic interfaces that detect or convey various types of haptic information, including tactile feedback (e.g., feedback that a user detects via nerves in the skin, which may also be referred to as cutaneous feedback) and/or kinesthetic feedback (e.g., feedback that a user detects via receptors located in muscles, joints, and/or tendons).

Figure 19:
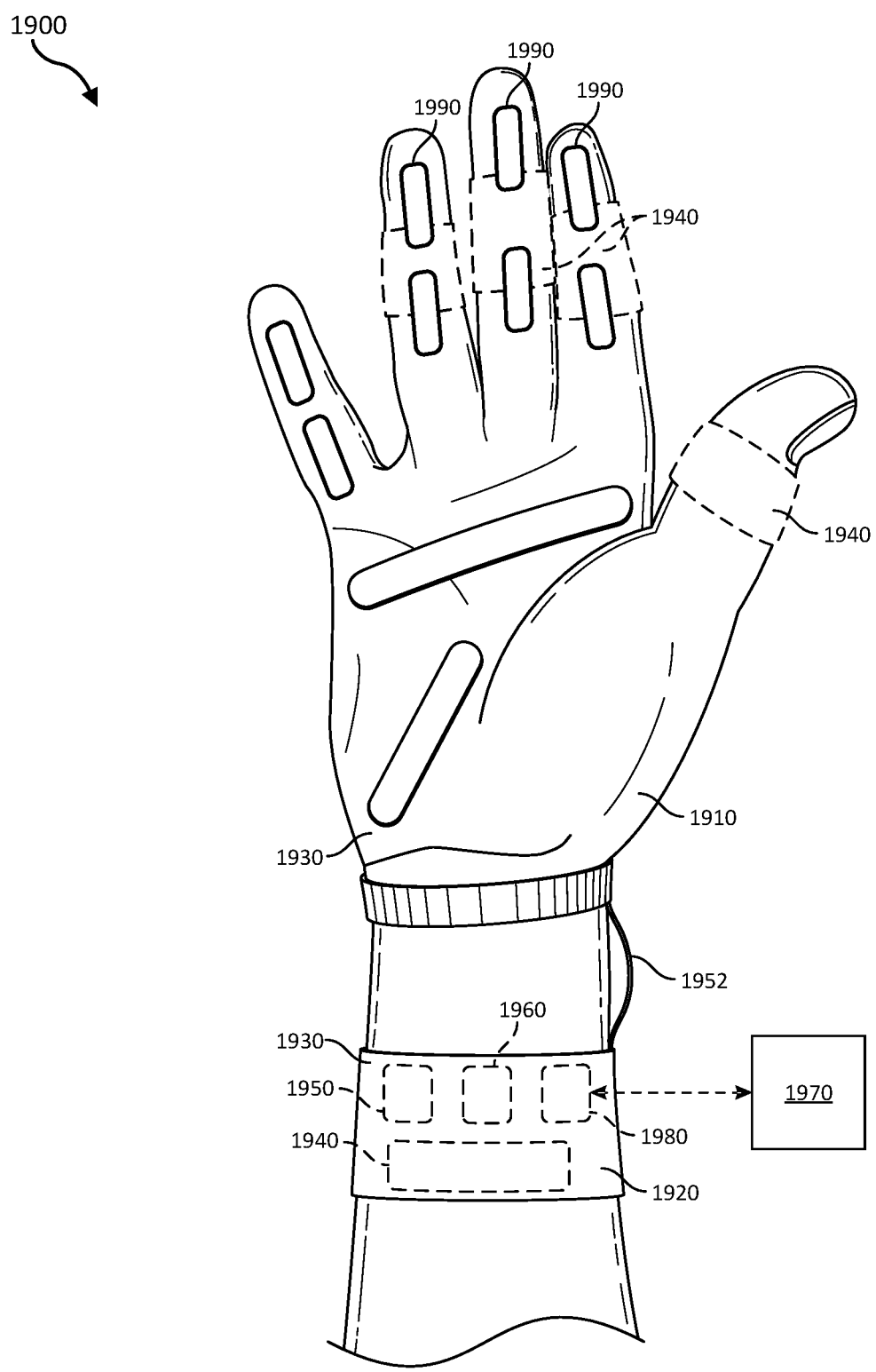
FIG. 19 is an illustration of exemplary haptic devices that may be used in connection with embodiments of this disclosure.

Haptic feedback may be provided by interfaces positioned within a user's environment (e.g., chairs, tables, floors, etc.) and/or interfaces on articles that may be worn or carried by a user (e.g., gloves, wristbands, etc.). As an example, FIG. 19 illustrates a vibrotactile system 1900 in the form of a wearable glove (haptic device 1910) and wristband (haptic device 1920). Haptic device 1910 and haptic device 1920 are shown as examples of wearable devices that include a flexible, wearable textile material 1930 that is shaped and configured for positioning against a user's hand and wrist, respectively. This disclosure also includes vibrotactile systems that may be shaped and configured for positioning against other human body parts, such as a finger, an arm, a head, a torso, a foot, or a leg. By way of example and not limitation, vibrotactile systems according to various embodiments of the present disclosure may also be in the form of a glove, a headband, an armband, a sleeve, a head covering, a sock, a shirt, or pants, among other possibilities. In some examples, the term "textile" may include any flexible, wearable material, including woven fabric, non-woven fabric, leather, cloth, a flexible polymer material, composite materials, etc.

One or more vibrotactile devices 1940 may be positioned at least partially within one or more corresponding pockets formed in textile material 1930 of vibrotactile system 1900. Vibrotactile devices 1940 may be positioned in locations to provide a vibrating sensation (e.g., haptic feedback) to a user of vibrotactile system 1900. For example, vibrotactile devices 1940 may be positioned against the user's finger(s), thumb, or wrist, as shown in FIG. 19. Vibrotactile devices 1940 may, in some examples, be sufficiently flexible to conform to or bend with the user's corresponding body part(s).

A power source 1950 (e.g., a battery) for applying a voltage to the vibrotactile devices 1940 for activation thereof may be electrically coupled to vibrotactile devices 1940, such as via conductive wiring 1952. In some examples, each of vibrotactile devices 1940 may be independently electrically coupled to power source 1950 for individual activation. In some examples, a processor 1960 may be operatively coupled to power source 1950 and configured (e.g., programmed) to control activation of vibrotactile devices 1940.

Vibrotactile system 1900 may be implemented in a variety of ways. In some examples, vibrotactile system 1900 may be a standalone system with integral subsystems and components for operation independent of other devices and systems. As another example, vibrotactile system 1900 may be configured for interaction with another device or system 1970. For example, vibrotactile system 1900 may, in some examples, include a communications interface 1980 for receiving and/or sending signals to the other device or system 1970. The other device or system 1970 may be a mobile device, a gaming console, an artificial-reality (e.g., virtual-reality, augmented-reality, mixed-reality) device, a personal computer, a tablet computer, a network device (e.g., a modem, a router, etc.), a handheld controller, etc. Communications interface 1980 may enable communications between vibrotactile system 1900 and the other device or system 1970 via a wireless (e.g., Wi-Fi, Bluetooth, cellular, radio, etc.) link or a wired link. If present, communications interface 1980 may be in communication with processor 1960, such as to provide a signal to processor 1960 to activate or deactivate one or more of the vibrotactile devices 1940.

Vibrotactile system 1900 may optionally include other subsystems and components, such as touch-sensitive pads 1990, pressure sensors, motion sensors, position sensors, lighting elements, and/or user interface elements (e.g., an on/off button, a vibration control element, etc.). During use, vibrotactile devices 1940 may be configured to be activated for a variety of different reasons, such as in response to the user's interaction with user interface elements, a signal from the motion or position sensors, a signal from the touch-sensitive pads 1990, a signal from the pressure sensors, a signal from the other device or system 1970, etc.

Although power source 1950, processor 1960, and communications interface 1980 are illustrated in FIG. 19 as being positioned in haptic device 1920, the present disclosure is not so limited. For example, one or more of power source 1950, processor 1960, or communications interface 1980 may be positioned within haptic device 1910 or within another wearable textile.

Figure 20:
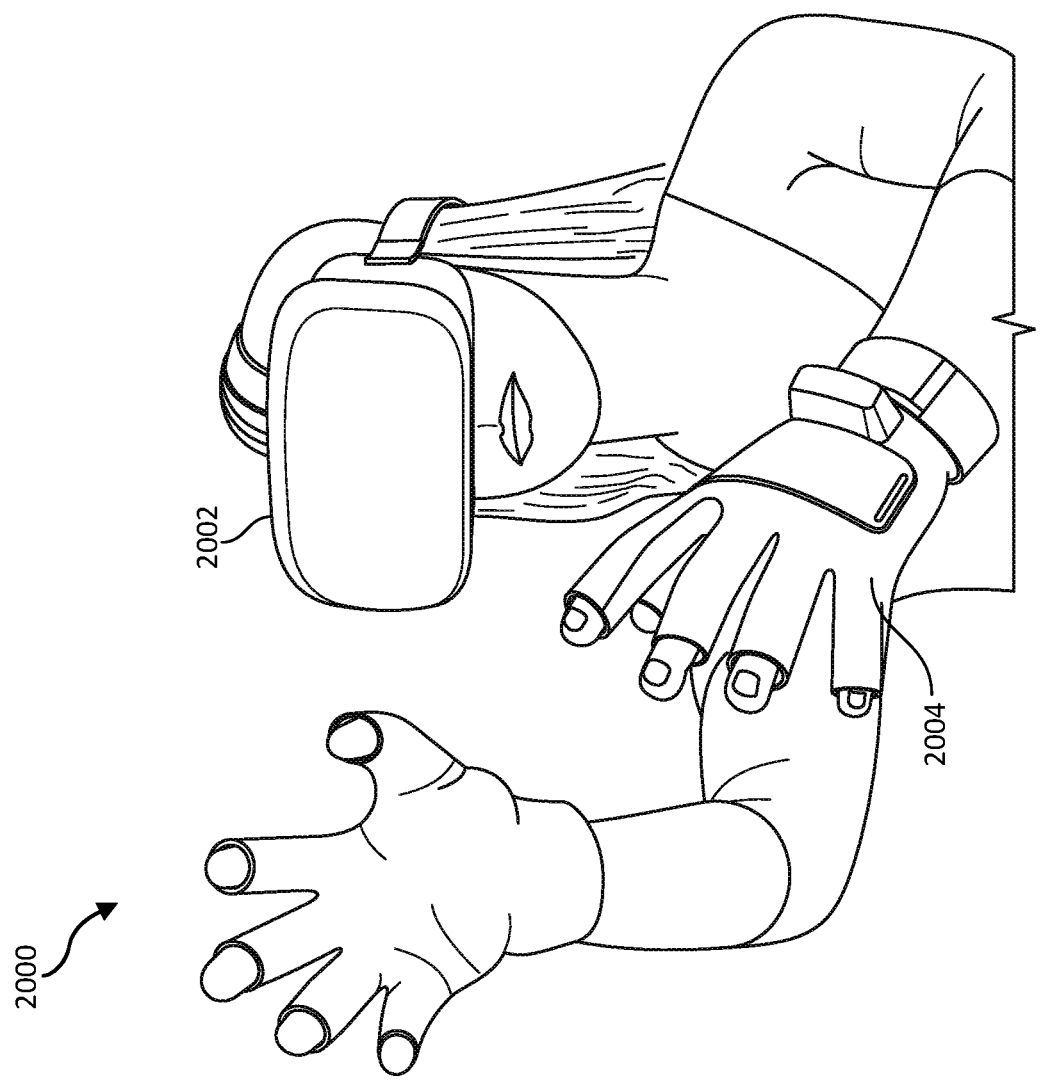
FIG. 20 is an illustration of an exemplary virtual-reality environment according to embodiments of this disclosure.

Haptic wearables, such as those shown in and described in connection with FIG. 19, may be implemented in a variety of types of artificial-reality systems and environments. FIG. 20 shows an example artificial-reality environment 2000 including one head-mounted virtual-reality display and two haptic devices (e.g., gloves), and in other embodiments any number and/or combination of these components and other components may be included in an artificial-reality system. For example, in some examples there may be multiple head-mounted displays each having an associated haptic device, with each head-mounted display and each haptic device communicating with the same console, portable computing device, or other computing system.

Figure 18:
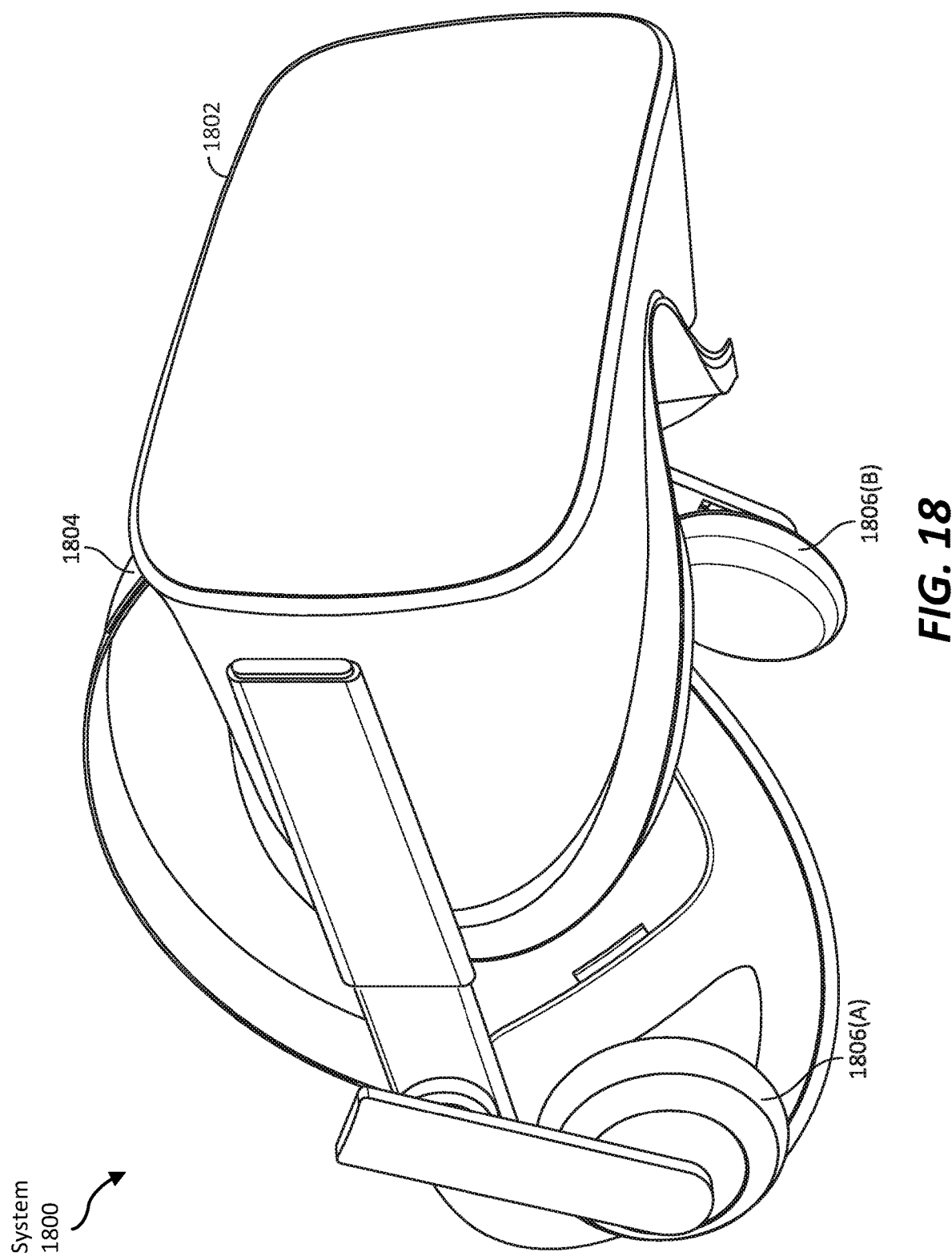
FIG. 18 is an illustration of an exemplary virtual-reality headset that may be used in connection with embodiments of this disclosure.

Head-mounted display 2002 generally represents any type or form of virtual-reality system, such as virtual-reality system 1800 in FIG. 18. Haptic device 2004 generally represents any type or form of wearable device, worn by a user of an artificial-reality system, that provides haptic feedback to the user to give the user the perception that he or she is physically engaging with a virtual object. In some examples, haptic device 2004 may provide haptic feedback by applying vibration, motion, and/or force to the user. For example, haptic device 2004 may limit or augment a user's movement. To give a specific example, haptic device 2004 may limit a user's hand from moving forward so that the user has the perception that his or her hand has come in physical contact with a virtual wall. In this specific example, one or more actuators within the haptic device may achieve the physical-movement restriction by pumping fluid into an inflatable bladder of the haptic device. In some examples, a user may also use haptic device 2004 to send action requests to a console. Examples of action requests include, without limitation, requests to start an application and/or end the application and/or requests to perform a particular action within the application.

Figure 21:
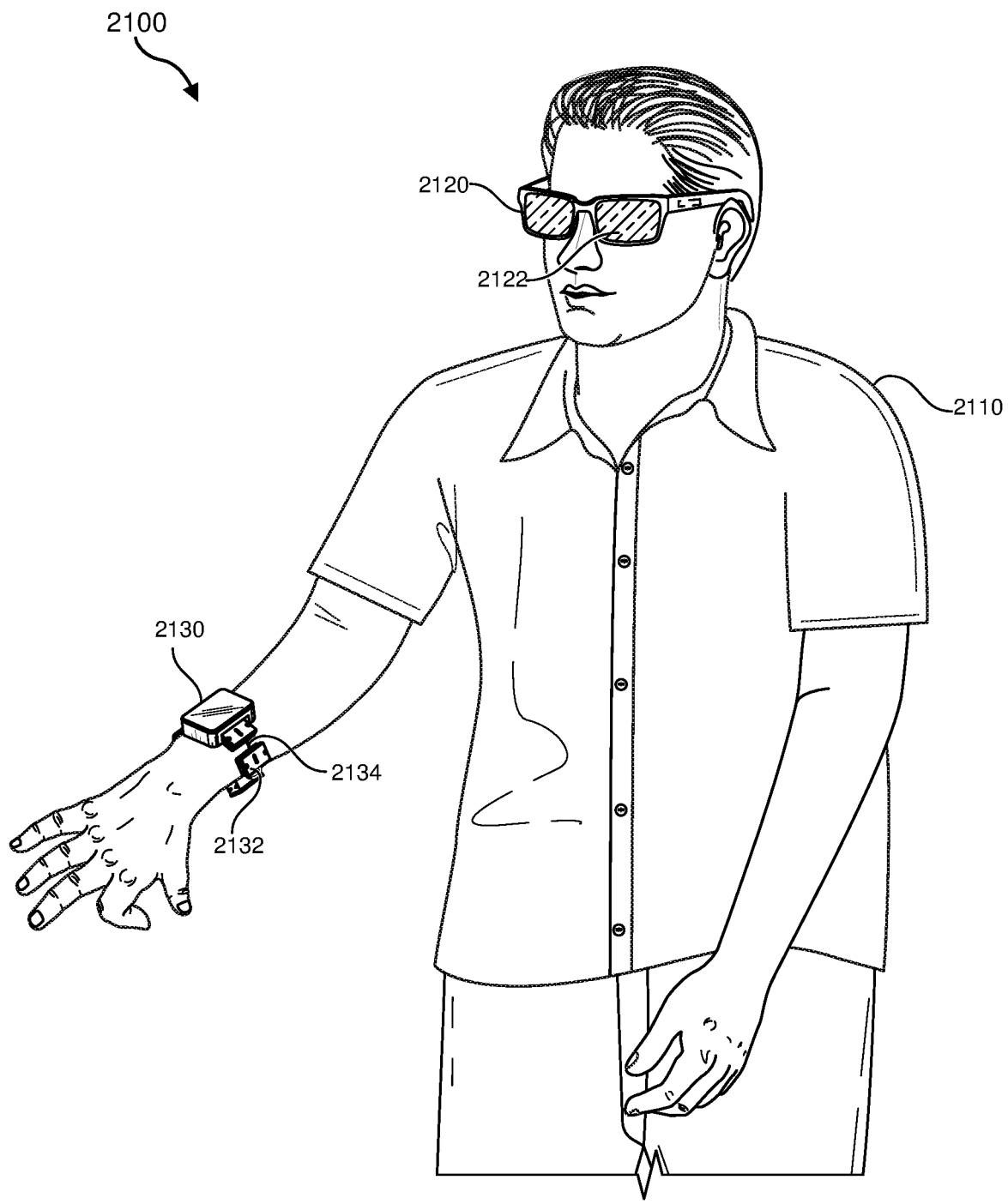
FIG. 21 is an illustration of an exemplary augmented-reality environment according to embodiments of this disclosure.

While haptic interfaces may be used with virtual-reality systems, as shown in FIG. 20, haptic interfaces may also be used with augmented-reality systems, as shown in FIG. 21. FIG. 21 is a perspective view of a user 2110 interacting with an augmented-reality system 2100. In this example, user 2110 may wear a pair of augmented-reality glasses 2120 that may have one or more displays 2122 and that are paired with a haptic device 2130. In this example, haptic device 2130 may be a wristband that includes a plurality of band elements 2132 and a tensioning mechanism 2134 that connects band elements 2132 to one another.

One or more of band elements 2132 may include any type or form of actuator suitable for providing haptic feedback. For example, one or more of band elements 2132 may be configured to provide one or more of various types of cutaneous feedback, including vibration, force, traction, texture, and/or temperature. To provide such feedback, band elements 2132 may include one or more of various types of actuators. In one example, each of band elements 2132 may include a vibrotactor (e.g., a vibrotactile actuator) configured to vibrate in unison or independently to provide one or more of various types of haptic sensations to a user. Alternatively, only a single band element or a subset of band elements may include vibrotactors.

Haptic devices 1910, 1920, 2004, and 2130 may include any suitable number and/or type of haptic transducer, sensor, and/or feedback mechanism. For example, haptic devices 1910, 1920, 2004, and 2130 may include one or more mechanical transducers, piezoelectric transducers, and/or fluidic transducers. Haptic devices 1910, 1920, 2004, and 2130 may also include various combinations of different types and forms of transducers that work together or independently to enhance a user's artificial-reality experience. In one example, each of band elements 2132 of haptic device 2130 may include a vibrotactor (e.g., a vibrotactile actuator) configured to vibrate in unison or independently to provide one or more of various types of haptic sensations to a user.

Figure 22A:
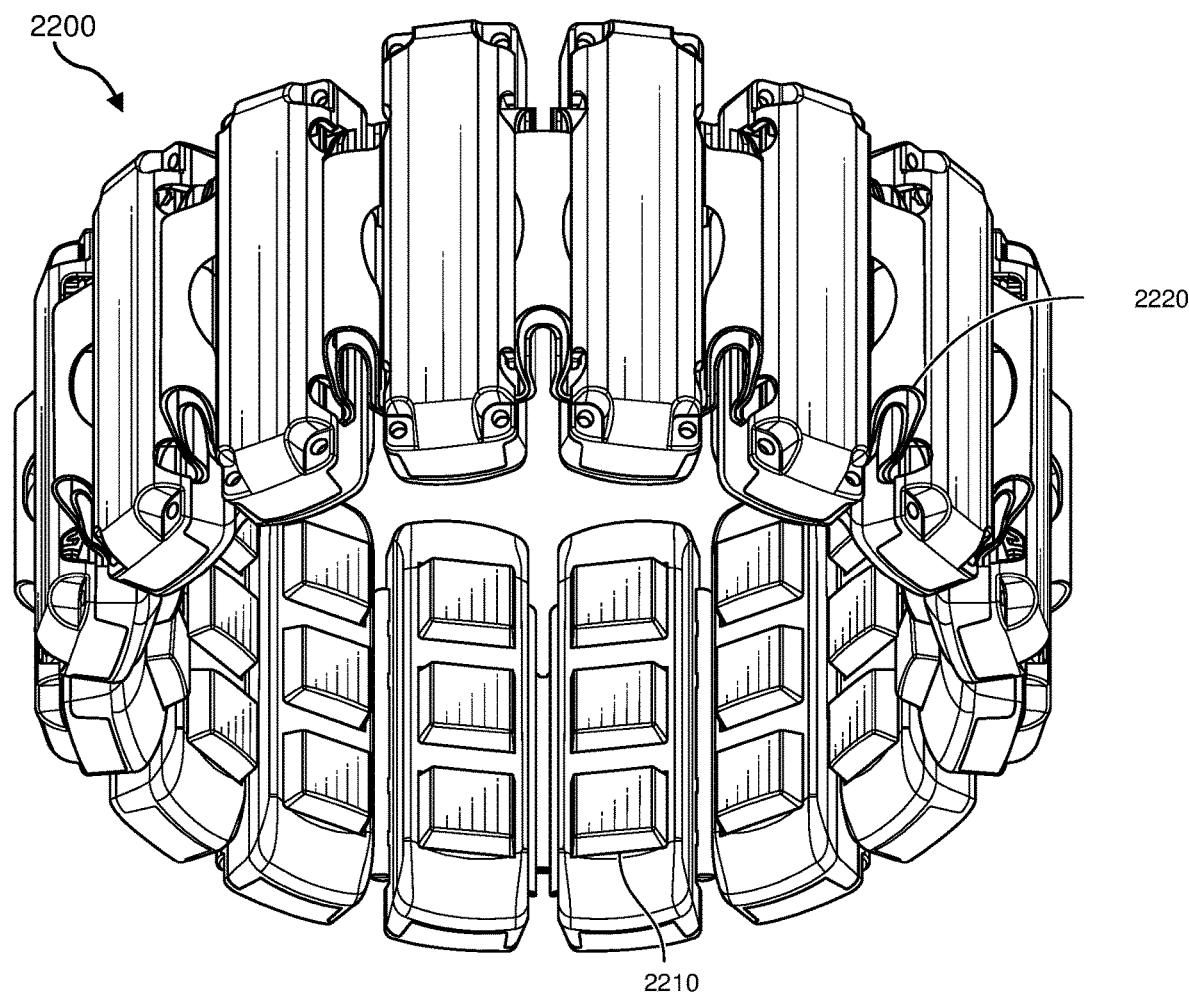
FIGS. 22A and 22B are illustrations of an exemplary human-machine interface configured to be worn around a user's lower arm or wrist.
Figure 22B:
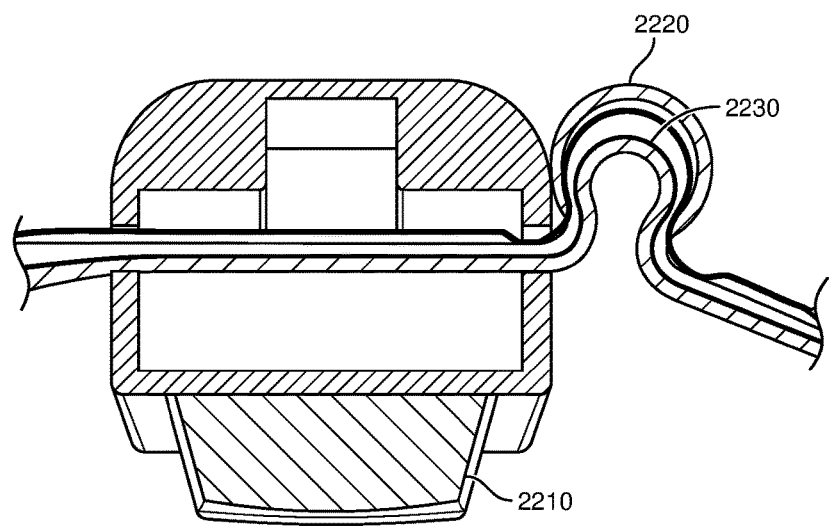

FIG. 22A illustrates an exemplary human-machine interface (also referred to herein as an EMG control interface) configured to be worn around a user's lower arm or wrist as a wearable system 900. In this example, wearable system 2200 may include sixteen neuromuscular sensors 2210 (e.g., EMG sensors) arranged circumferentially around an elastic band 2220. However, any suitable number of neuromuscular sensors may be used. The number and arrangement of neuromuscular sensors may depend on the particular application for which the wearable device is used. For example, a wearable armband or wristband may be used to generate control information for controlling an augmented-reality system, a robot, controlling a vehicle, scrolling through text, controlling a virtual avatar, or any other suitable control task. As shown, the sensors may be coupled together using flexible electronics incorporated into the wireless device. FIG. 22B illustrates a cross-sectional view through one of the sensors of the wearable device shown in FIG. 22A. In some examples, the output of one or more of the sensing components may be optionally processed using hardware signal processing circuitry (e.g., to perform amplification, filtering, and/or rectification). In other embodiments, at least some signal processing of the output of the sensing components may be performed in software. Thus, signal processing of signals sampled by the sensors may be performed in hardware, software, or by any suitable combination of hardware and software, as aspects of the technology described herein are not limited in this respect. A non-limiting example of a signal processing chain used to process recorded data from sensors 2210 is discussed in more detail below with reference to FIGS. 23A and 23B.

Figure 23A:
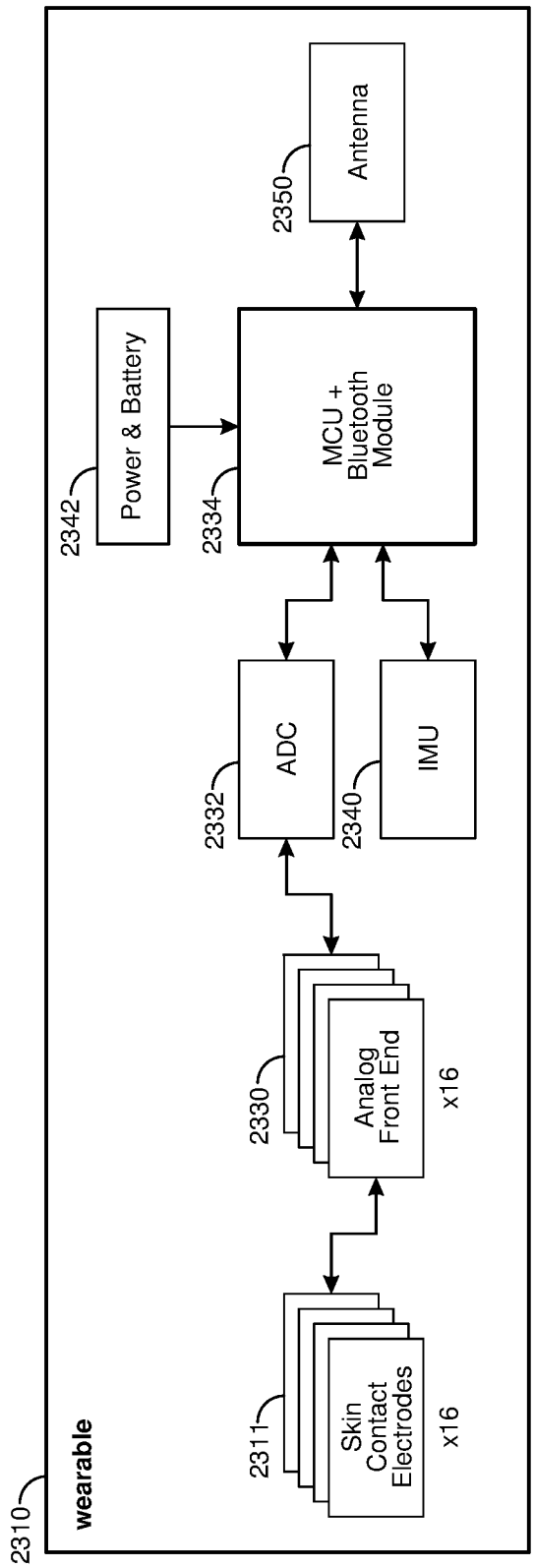
FIGS. 23A and 23B are illustrations of an exemplary schematic diagram illustrating internal components of a wearable system.
Figure 23B:
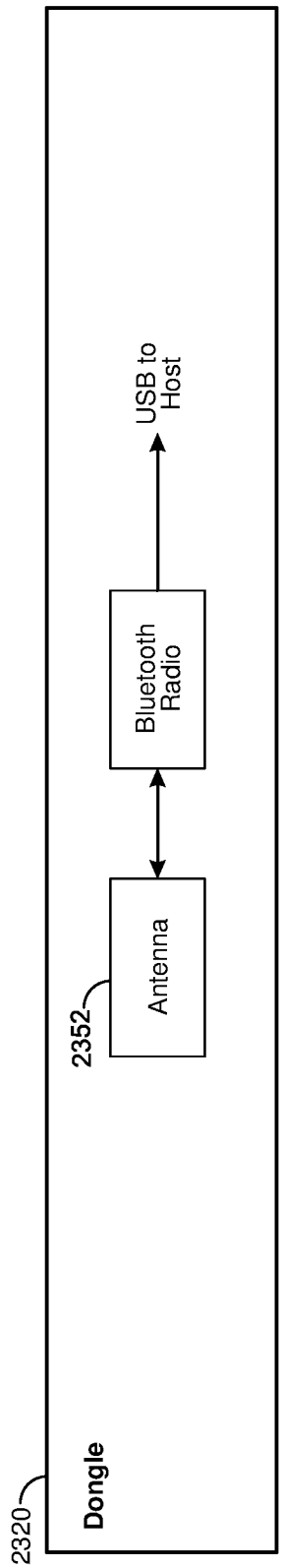

FIGS. 23A and 23B illustrate an exemplary schematic diagram with internal components of a wearable system with EMG sensors. As shown, the wearable system may include a wearable portion 2310 (FIG. 23A) and a dongle portion 2320 (FIG. 23B) in communication with the wearable portion 2310 (e.g., via BLUETOOTH or another suitable wireless communication technology). As shown in FIG. 23A, the wearable portion 2310 includes sensors 2211, examples of which are described in connection with FIGS. 22A and 22B. The output of the sensors 2311 is provided to analog front end 2330, which may be configured to perform analog processing (e.g., amplification, noise reduction, filtering, etc.) on the recorded signals. The processed analog signals are then provided to analog-to-digital converter 2332, which may convert the analog signals to digital signals that may be processed by one or more computer processors. An example of a computer processor that may be used in accordance with some examples is microcontroller (MCU) 2334, illustrated in FIG. 23A. As shown, MCU 2334 may also include inputs from other sensors (e.g., IMU sensor 2340), and power and battery module 2342. The output of the processing performed by MCU may be provided to antenna 2350 for transmission to dongle portion 2320 shown in FIG. 23B.

Dongle portion 2320 includes antenna 2352 configured to communicate with antenna 2350 included as part of wearable portion 2310. Communication between antenna 2350 and 2352 may occur using any suitable wireless technology and protocol, non-limiting examples of which include radiofrequency signaling and BLUETOOTH. As shown, the signals received by antenna 2352 of dongle portion 2320 may be provided to a host computer for further processing, display, and/or for effecting control of a particular physical or virtual object or objects.

Although the examples provided with reference to FIGS. 22A-22B and FIGS. 23A-23B are discussed in the context of interfaces with EMG sensors, the techniques described herein for reducing electromagnetic interference may also be implemented in wearable interfaces with other types of sensors including, but not limited to, mechanomyography (MMG) sensors, sonomyography (SMG) sensors, and electrical impedance tomography (EIT) sensors. The techniques described herein for reducing electromagnetic interference may also be implemented in wearable interfaces that communicate with computer hosts through wires and cables (e.g., USB cables, optical fiber cables, etc.).

The above-described embodiments can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware or with one or more processors programmed using microcode or software to perform the functions recited above.

In this respect, it should be appreciated that one implementation of the embodiments of the present invention comprises at least one non-transitory computer readable storage medium (e.g., a computer memory, a portable memory, a compact disk, etc.) encoded with a computer program (e.g., a plurality of instructions), that, when executed on a processor, performs the above-discussed functions of the embodiments of the present invention. The computer-readable storage medium can be transportable such that the program stored thereon can be loaded onto any computer resource to implement the aspects of the present invention discussed herein. In addition, it should be appreciated that the reference to a computer program that, when executed, performs the above-discussed functions, is not limited to an application program running on a host computer. Rather, the term computer program is used herein in a generic sense to reference any type of computer code (e.g., software or microcode) that can be employed to program a processor to implement the above-discussed aspects of the present invention.

Various aspects of the present invention may be used alone, in combination, or in a variety of arrangements not specifically discussed in the embodiments described in the foregoing and are therefore not limited in their application to the details and arrangement of components set forth in the foregoing description or illustrated in the drawings. For example, aspects described in one embodiment may be combined in any manner with aspects described in other embodiments.

Also, embodiments of the invention may be implemented as one or more methods, of that an example has been provided. The acts performed as part of the method(s) may be ordered in any suitable way. Accordingly, embodiments may be constructed in that acts are performed in an order different than illustrated, that may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in that acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing," "involving," and variations thereof, is meant to encompass the items listed thereafter and additional items.

Having described several embodiments of the invention in detail, various modifications and improvements will readily occur to those skilled in the art. Such modifications and improvements are intended to be within the spirit and scope of the invention. Accordingly, the foregoing description is by way of example only, and is not intended as limiting.

By way of non-limiting examples, the following embodiments are included in the present disclosure.

Example 1: A method, comprising detecting motion of a user, estimating, for the detected motion of the user, effort expended by the user in performing the motion, determining, based on the detected motion and the estimation of expended effort, a haptic profile for conveying to the user a physical sensation of expending the effort, and simulating a sensation of expending the effort by executing the haptic profile in at least one haptic device that is worn by the user.

Example 2: The method of Example 1, further comprising displaying, to the user via a display device, a representation of the detected motion of the user, wherein executing the haptic profile is synchronized with displaying the representation of the detected motion of the user.

Example 3: The method of Example 1 or Example 2, wherein detecting the motion of the user comprises detecting the motion with at least one sensor positioned on a device being worn by the user.

Example 4: The method of any of Examples 1 through 3, wherein the at least one sensor comprises a camera, and the motion of the user is detected by processing, via a computer vision system, an output of the camera.

Example 5: The method of any of Examples 1 through 4, wherein estimating the effort expended by the user comprises at least one of calculating a linear velocity of a body part of the user, calculating a linear acceleration of the body part of the user, calculating a rotational velocity of the body part of the user, or calculating a rotational acceleration of the body part of the user.

Example 6: The method of any of Examples 1 through 5, wherein determining the haptic profile comprises choosing, based on the estimation of the effort expended by the user, an amount of force to be applied to the user by the at least one haptic device.

Example 7: The method of any of Examples 1 through 6, wherein the at least one haptic device is dimensioned to fit about a body part of the user and the at least one haptic device comprises a tensioning mechanism and an actuator that is coupled to the tensioning mechanism and that, when actuated, causes substantially tangential movement of the tensioning mechanism relative to a surface of the body part to produce substantially orthogonal movement of the at least one haptic device relative to the surface of the body part.

Example 8: The method of any of Examples 1 through 7, wherein executing the haptic profile via the at least one haptic device comprises directing the tensioning mechanism to execute at least a portion of the haptic profile.

Example 9: The method of any of Examples 1 through 8, the at least one haptic device further comprises a force sensor, executing the haptic profile comprises receiving feedback from the force sensor that indicates an amount of force the at least one haptic device is exerting on the user; and directing the tensioning mechanism to execute at least a portion of the haptic profile comprises adjusting an amount of tension created by the tensioning mechanism based on the indicated amount of force that the haptic device is exerting on the user.

Example 10: The method of any of Examples 1 through 9, wherein the force sensor comprises a force-transfer plate coupled to the at least one haptic device and dimensioned to contact a body part of the user when the at least one haptic device is worn by the user.

Example 11: The method of any of Examples 1 through 10, further comprising displaying an amplified representation of the detected motion of the user in visual content displayed to the user, wherein the amplified representation of the detected motion of the user comprises an adjusted range of the detected motion of the user, and the simulated sensation of expending the effort is further based on displaying the amplified representation of the detected motion to the user.

Example 12: A system comprising a head-mounted display, a haptic device, and one or more physical processors configured to perform operations comprising mapping one or more forces to be provided at a wrist of a user by the haptic device to one or more force sensations, and applying the one or more forces to the wrist of the user by the haptic device, wherein applying the one or more forces to the wrist of the user by the haptic device induces a perception of the one or more force sensations to at least one of a palm of the user or one or more fingers of the user.

Example 13: The system of Example 12, wherein the haptic device is configured to convey the one or more force sensations to the one or more fingers of the user to simulate an interaction of the one or more fingers of the user with a virtual stationary object.

Example 14: The system of Example 12 or Example 13, wherein the haptic device is configured to convey the one or more force sensations to the one or more fingers of the user to simulate an interaction of the one or more fingers of the user with a virtual object while the user is manipulating the virtual object using the one or more fingers.

Example 15: The system of any of Examples 12 through 14, wherein the one or more force sensations comprises an impact sensation and the haptic device is configured to convey the impact sensation to the palm of the user to simulate an interaction of the palm of the user with a virtual object.

Example 16: The system of any of Examples 12 through 15, wherein the one or more forces applied to the wrist of the user by the haptic device comprises at least one of a vibrotactile force applied to at least a portion of the wrist or a substantially orthogonal force relative to a surface of the wrist of the user.

Example 17: The system of any of Examples 12 through 16, further comprising displaying, to the user via the head-mounted display, a virtual representation of an object that the user interacts with when the haptic device conveys the one or more force sensations, wherein conveying the one or more force sensations is synchronized with displaying the virtual representation of the object.

Example 18: The system of any of Examples 12 through 17, wherein mapping the one or more forces provided at the wrist of the user to the one or more force sensations comprises choosing, based on an interaction of the user with a virtual object, an amount of the force to be applied by the haptic device.

Example 19: The system of any of Examples 12 through 18, wherein the haptic device is dimensioned to fit about the wrist of the user and comprises a tensioning mechanism harnessed to the haptic device in a manner that is relative to the fit of the haptic device about the wrist of the user and an actuator that is coupled to the tensioning mechanism and that, when actuated, causes substantially tangential movement of the tensioning mechanism relative to a surface of the wrist to produce substantially orthogonal movement of the haptic device relative to the surface of the wrist.

Example 20: A non-transitory computer-readable medium comprising computer-readable instructions that, when executed by at least one processor of a computing device, cause the computing device to detect a motion of a user, estimate, for the detected motion of the user, effort expended by the user in performing the motion, determine, based on the detected motion and the estimation of expended effort, a haptic profile for conveying to the user a physical sensation of expending the effort, and simulate a sensation of expending the effort by executing the haptic profile in at least one haptic device that is worn by the user.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method, comprising:
   detecting motion of a user;
   estimating, for the detected motion of the user, effort expended by the user in performing the motion;
   displaying an amplified representation of the detected motion of the user, wherein the amplified representation of the detected motion of the user increases an effort perceived by the user of the amplified representation of the detected motion;
   determining, based on the amplified representation of the detected motion and the estimation of expended effort, a haptic profile for conveying to the user a physical sensation of expending the effort; and
   executing the haptic profile in at least one haptic device that is in contact with a first body part of the user so as to induce a sensation of expending the effort in a second body part of the user.

2. The method of claim 1, wherein executing the haptic profile is synchronized with displaying the amplified representation of the detected motion of the user.

3. The method of claim 1, wherein detecting the motion of the user comprises detecting the motion with at least one sensor positioned on a device being worn by the user.

4. The method of claim 3, wherein:
   the at least one sensor comprises a camera; and
   the motion of the user is detected by processing, via a computer vision system, an output of the camera.

5. The method of claim 1, wherein estimating the effort expended by the user comprises at least one of:
   calculating a linear velocity of a moving body part of the user;
   calculating a linear acceleration of the moving body part of the user;
   calculating a rotational velocity of the moving body part of the user; or
   calculating a rotational acceleration of the moving body part of the user.

6. The method of claim 5, wherein determining the haptic profile comprises choosing, based on the amplified representation of the detected motion and the estimation of the effort expended by the user, an amount of force to be applied to the first body part of the user by the at least one haptic device.

7. The method of claim 1, wherein the at least one haptic device is dimensioned to fit about the first body part of the user and the at least one haptic device comprises:
   a tensioning mechanism; and
   an actuator that is coupled to the tensioning mechanism and that, when actuated, causes substantially tangential movement of the tensioning mechanism relative to a surface of the first body part to produce substantially orthogonal movement of the at least one haptic device relative to the surface of the first body part.

8. The method of claim 7, wherein executing the haptic profile via the at least one haptic device comprises directing the tensioning mechanism to execute at least a portion of the haptic profile.

9. The method of claim 8, wherein:
   the at least one haptic device further comprises a force sensor;
   executing the haptic profile comprises receiving feedback from the force sensor that indicates an amount of force the at least one haptic device is exerting on the first body part of the user; and
   directing the tensioning mechanism to execute at least a portion of the haptic profile comprises adjusting an amount of tension created by the tensioning mechanism based on the indicated amount of force that the at least one haptic device is exerting on the first body part of the user.

10. The method of claim 9, wherein the force sensor comprises a force-transfer plate coupled to the at least one haptic device and dimensioned to contact the first body part of the user when the at least one haptic device is worn by the user.

11. The method of claim 1, wherein:
    the amplified representation of the detected motion of the user comprises an adjusted range of the detected motion of the user, and
    a simulated sensation of expending the perceived effort is based on displaying the amplified representation of the detected motion to the user.

12. A system comprising:
    a head-mounted display;
    a haptic device shaped and sized for mounting to a first body part of a user; and
    one or more physical processors configured to perform operations comprising:
    mapping one or more forces to be provided at the first body part of the user by the haptic device to one or more force sensations by:
    estimating, for detected motion of the user, effort expended by the user in performing the detected motion;
    displaying, in the head-mounted display, an amplified representation of the detected motion of the user, wherein the amplified representation of the detected motion of the user increases an effort perceived by the user of the amplified representation of the detected motion;
    determining, based on the amplified representation of the detected motion and the estimation of expended effort, a haptic profile for conveying to the user a physical sensation of expending the effort; and
    applying the one or more forces to the first body part of the user by the haptic device, wherein applying the one or more forces to the first body part of the user by the haptic device induces a perception of the one or more force sensations to at least a second body part of the user.

13. The system of claim 12, wherein the haptic device is configured to convey the one or more force sensations to the second body part of the user to simulate an interaction of one or more fingers of the user with a virtual stationary object.

14. The system of claim 12, wherein the haptic device is configured to convey the one or more force sensations to the second body part of the user to simulate an interaction of one or more fingers of the user with a virtual object while the user is manipulating the virtual object using the one or more fingers.

15. The system of claim 12, wherein:
- the one or more force sensations comprises an impact sensation; and
- the haptic device is configured to convey the impact sensation to the second body part of the user to simulate an interaction of a palm of the user with a virtual object.

16. The system of claim 12, wherein the one or more forces applied to the first body part of the user by the haptic device comprises at least one of:
- a vibrotactile force applied to at least a portion of a wrist of the user; or
- a substantially orthogonal force relative to a surface of the wrist of the user.

17. The system of claim 12, further comprising displaying, to the user via the head-mounted display, a virtual representation of an object that the user interacts with when the haptic device conveys the one or more force sensations, wherein conveying the one or more force sensations is synchronized with displaying the virtual representation of the object.

18. The system of claim 12, wherein mapping the one or more forces provided at the first body part of the user to the one or more force sensations comprises choosing, based on an interaction of the user with a virtual object, an amount of force to be applied by the haptic device.

19. The system of claim 12, wherein the haptic device is dimensioned to fit about the first body part of the user and comprises:
- a tensioning mechanism harnessed to the haptic device in a manner that is relative to the fit of the haptic device about a wrist of the user; and
- an actuator that is coupled to the tensioning mechanism and that, when actuated, causes substantially tangential movement of the tensioning mechanism relative to a surface of the wrist to produce substantially orthogonal movement of the haptic device relative to the surface of the wrist.

20. A non-transitory computer-readable medium comprising computer-readable instructions that, when executed by at least one processor of a computing device, cause the computing device to:
- detect a motion of a user;
- estimate, for the detected motion of the user, effort expended by the user in performing the motion;
- display an amplified representation of the detected motion of the user, wherein the amplified representation of the detected motion of the user increases an effort perceived by the user of the amplified representation of the detected motion;
- determine, based on the amplified representation of the detected motion and the estimation of expended effort, a haptic profile for conveying to the user a physical sensation of expending the effort; and
- executing the haptic profile in at least one haptic device that is in contact with a first body part of the user so as to induce a sensation of expending the effort in a second body part of the user.

* * * * *